United States Patent
Connolly et al.

(10) Patent No.: US 10,498,802 B1
(45) Date of Patent: *Dec. 3, 2019

(54) MULTI-NODE DATA STORE MANAGEMENT

(71) Applicant: DataCore Software Corporation, Fort Lauderdale, FL (US)

(72) Inventors: Nicholas C. Connolly, Purley (GB); Robert Bassett, Pensacola, FL (US); Ziya Aral, Pompano Beach, FL (US); Roni J. Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,345

(22) Filed: May 21, 2018

Related U.S. Application Data

(63) Continuation of application No. 14/212,165, filed on Mar. 14, 2014, now Pat. No. 10,003,636.

(60) Provisional application No. 61/794,465, filed on Mar. 15, 2013.

(51) Int. Cl.
*H04L 29/08* (2006.01)

(52) U.S. Cl.
CPC .................. *H04L 67/10* (2013.01)

(58) Field of Classification Search
CPC .... G06F 3/0665; G06F 3/067; G06F 2201/84; H04L 67/10; H04L 67/1095; H04L 67/1097
See application file for complete search history.

(56) References Cited

U.S. PATENT DOCUMENTS

| | | | |
|---|---|---|---|
| 6,530,043 B1 | 3/2003 | Beardsley et al. | |
| 6,732,125 B1* | 5/2004 | Autrey | G06F 11/1466 707/640 |
| 7,565,498 B1* | 7/2009 | Baird | G06F 3/061 710/39 |
| 2007/0100917 A1* | 5/2007 | Annano | G06F 11/1435 |
| 2007/0168403 A1 | 7/2007 | Meiri et al. | |
| 2007/0214334 A1* | 9/2007 | Maruyama | G06F 11/1469 711/165 |
| 2008/0243946 A1* | 10/2008 | Deguchi | G06F 11/1471 |
| 2009/0013012 A1* | 1/2009 | Ichikawa | G06F 11/1464 |
| 2010/0077173 A1* | 3/2010 | Rao | G06F 11/1458 711/170 |
| 2014/0074969 A1* | 3/2014 | Kadayam | G06F 11/2064 709/217 |
| 2014/0351545 A1 | 11/2014 | Nakajima | |

OTHER PUBLICATIONS

U.S. Office Action dated Jun. 30, 2017 for commonly assigned U.S. Appl. No. 12/926,438.

(Continued)

*Primary Examiner* — Gil H. Lee
(74) *Attorney, Agent, or Firm* — Michael Best & Friedrich LLP

(57) ABSTRACT

A node based architecture that supports arbitrary access to any node in a system for data representation and access, while still providing virtual volume coherency that is global to all of the nodes in the system, and while providing underlying data management services that are also variously accessible from any node in the system.

17 Claims, 28 Drawing Sheets

(56) References Cited

OTHER PUBLICATIONS

U.S. Notice of Allowance dated Dec. 15, 2017 for commonly assigned U.S. Appl. No. 12/926,438.
U.S. Office Action dated Dec. 29, 2016 for commonly assigned U.S. Appl. No. 12/926,438, filed Nov. 18, 2010.
U.S. Office Action dated Apr. 6, 2016 for commonly assigned U.S. Appl. No. 12/926,438, filed Nov. 18, 2010.

* cited by examiner

| TYPE_WRITE |
|---|
| Block Offset in Volume |
| Length of Write in Blocks |
| Block offset of data in Data Store |

| TYPE_ZERO |
|---|
| Block Offset in Volume |
| Length of Write in Blocks |
| |

| TYPE_TIME |
|---|
| Timestamp |
| |
| |

| |
|---|
| TYPE WRITE |
| BLOCK OFFSET IN VOLUME |
| LENGTH OF WRITE IN BLOCKS |
| COPY 1: (DATA STORE IDENTIFIER AND LOCATION) |
| COPY 2: (DATA STORE IDENTIFIER AND LOCATION) |
| . . . |
| COPY N: (DATA STORE IDENTIFIER AND LOCATION) |

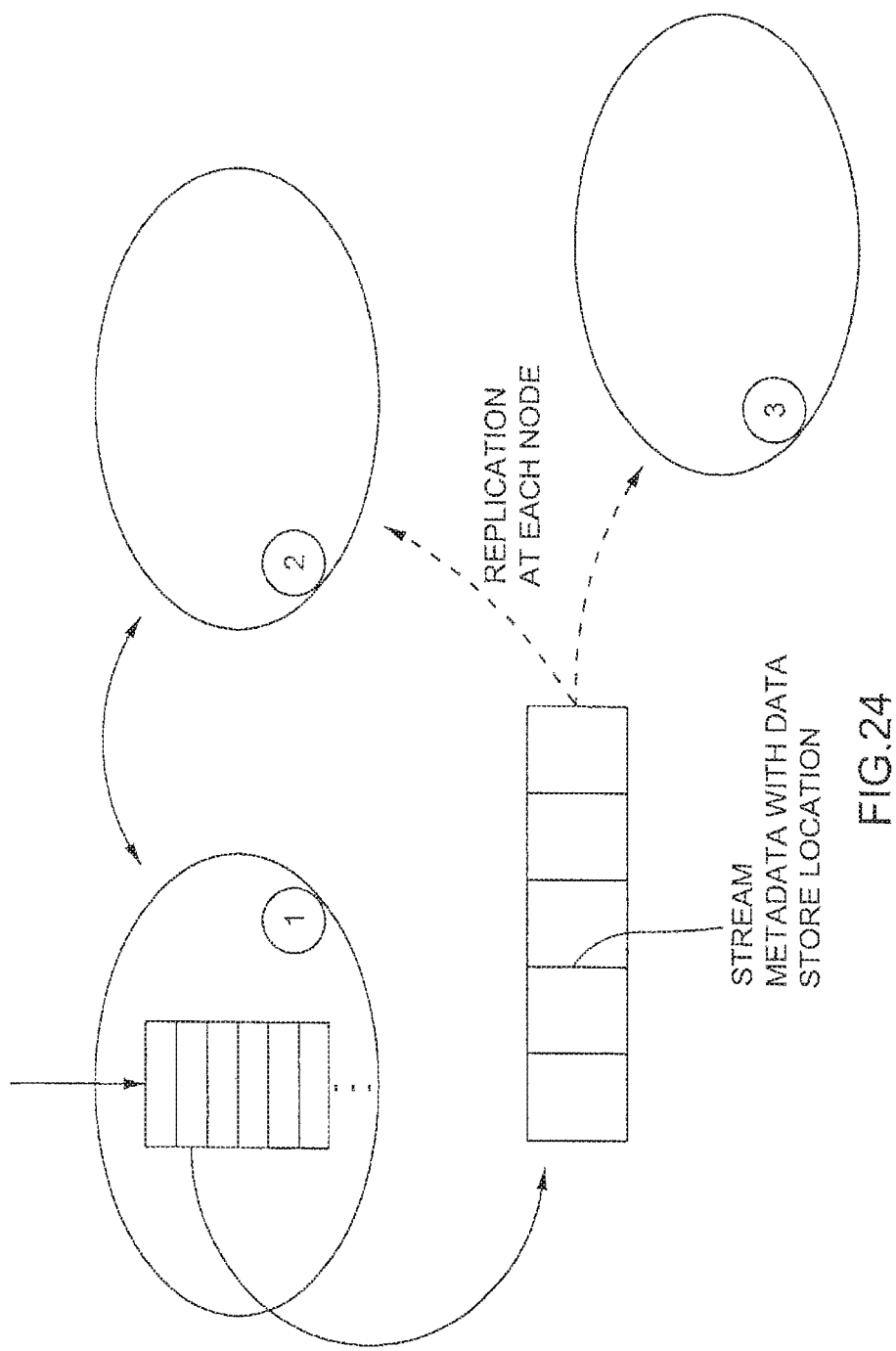

US 10,498,802 B1

MULTI-NODE DATA STORE MANAGEMENT

CROSS REFERENCE TO RELATED APPLICATIONS

This application is a continuation of U.S. application Ser. No. 14/212,165, filed Mar. 14, 2014, which claims priority to provisional Appl. Ser. No. 61/794,465, filed on Mar. 15, 2013, the entire contents of which are hereby incorporated by reference.

BACKGROUND OF THE INVENTION

Field of the Invention

This application relates generally to data representation and more particularly to a node based architecture that supports arbitrary access to any node in a system for data representation and access.

SUMMARY OF THE INVENTION

A node based architecture that supports arbitrary access to any node in a system for data representation and access, while still providing virtual volume coherency that is global to all of the nodes in the system, and while providing underlying data management services that are also variously accessible from any node in the system.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which:

FIGS. 14A-C are block diagrams illustrating example of a stream overhead data.

FIG. 23A illustrates an example of overhead data that is used to manage IO transactions in the node based architecture.

FIG. 24 illustrates replication of overhead data at each node.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

According to one aspect, this document describes a node-based virtualization system. In one example, each node in the system has the ability to coherently present and maintain virtual volumes that may be presented to a host accessing any node in the system. Virtual volume coherency extends across all nodes, any node may be arbitrarily accessed for IO transactions, and any node has the ability to cache underlying data coherently for the presented volume(s).

Cloud systems purport to provide storage or the like, and to allow access from various locations. However, the various locations through which a user may access data in the cloud are merely conduits to some other location where the data is stored. The access locations themselves have no conception of volume coherency or the corresponding data, other than perhaps the pieces of data transferring through the local conduit.

The node-based virtualization system provides more robust, flexible and manageable presentation of virtualized storage. If a first node fails, a second node is completely accessible to accommodate an IO transaction. Numerous nodes can be provided in a given system, and any number of nodes may be used for asynchronous replication as desired. Additionally, the nodes do not have to be homogenous.

However, it is preferred that each node in the system have the capability of receiving access, responding to IO transactions, and maintaining volume coherency.

Figure 21:
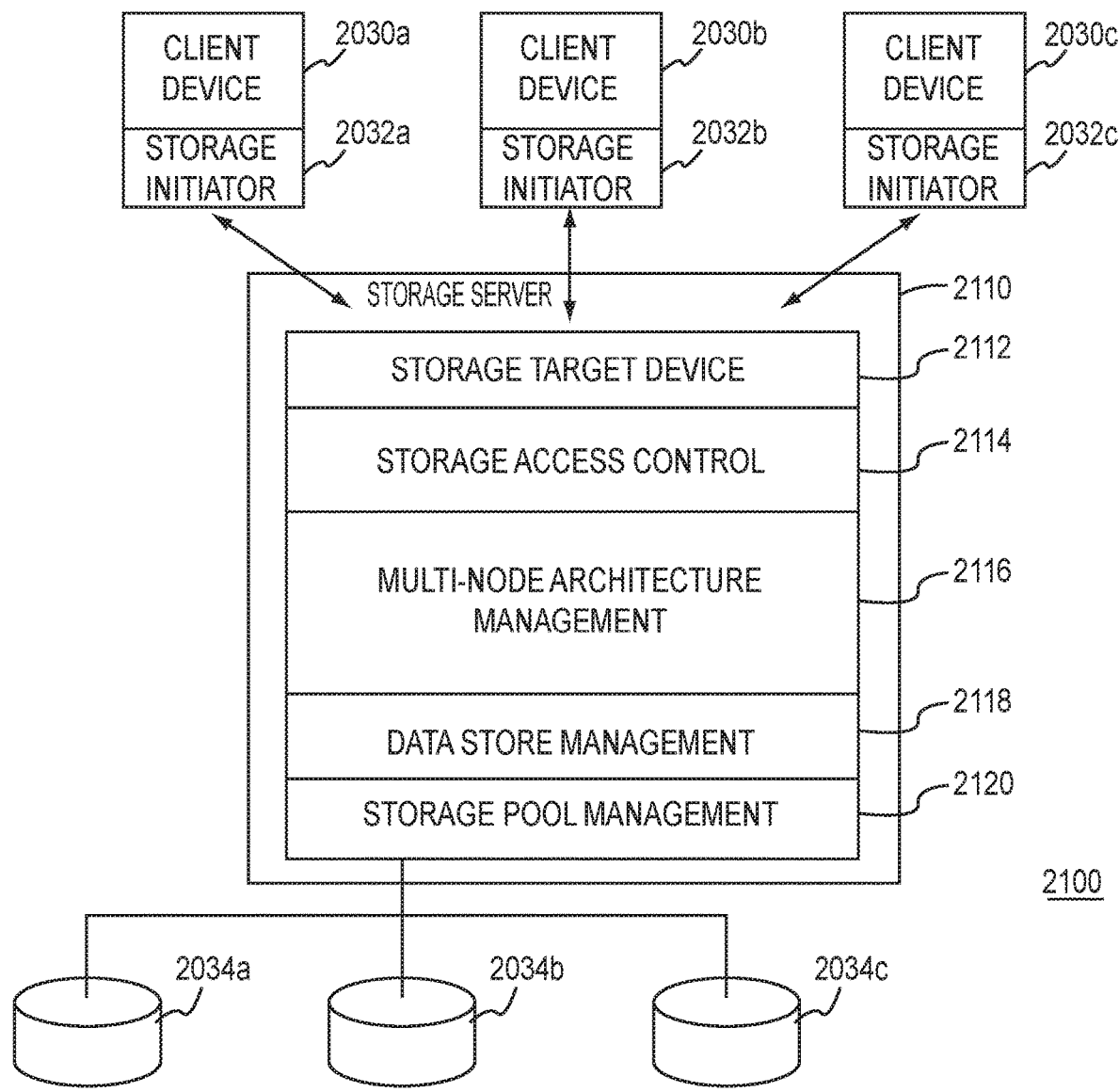
FIG. 21 is a schematic diagram illustrating an example of a storage server for a given node in the node-based architecture.

FIG. 21 is a schematic diagram illustrating an example of a storage server 2110 for a given node in the node-based architecture 2100. The storage server 2110 operates in the node based architecture and thus supports arbitrary access to any node in the system for data representation and access, while still providing virtual volume coherency that is global to all of the nodes in the system, and while providing underlying data management services that are also variously accessible from any node in the system. These features are provided according to the details described herein, and are carried out in particular by the node architecture management module.

The node architecture management module 2216 is resident on the storage server 2110, which in some embodiments may be a storage domain server (SDS). The storage server includes conventional computing resources (processor, memory, etc.) in order to carry out the functionality of operating as a data representation and access resource for one or more client devices.

Specifically, the storage server may present virtual volumes to the client devices 2030a-c. Interfacing between the storage server and client devices may be according to any conventional protocol. For example, storage initiator devices 2032a-c of the client devices 2030a-c and a storage target device 2112 of the storage server 2110 may be established according to an iSCSI protocol. Alternatively, Fibre Channel (FC), SCSI, or other protocols may be used for communications between initiator and target devices.

The storage server 2110 may also provide security controls 2114 as well as any number of storage applications such as synchronous and asynchronous replication services, snapshots, caching, thin provisioning, etc.

The storage server may also include storage pool management 2120 that is configured to manage a pool of physical storage resources that are available to the storage server. The physical storage resources 2034a-c may include hard disks, optical discs, tape, solid state memory, aggregations of any form of storage, or even an SDS that in turn provides corresponding physical storage resources.

The data store management module 2118 provides basic stream architecture functionality as described above, including the management of the stream with regard to write transactions, with retention of the corresponding sequence of write transactions according to the order in which the write transactions are received for any given volume that is presented to one or more of the client devices 2130a-c by the server 2110. The data store management module may also facilitates the association of the various types of stream images described above to the stream, and access to the stream in order to carry out the presentation and possible retention of corresponding images based upon the described stream images, also as described above.

The storage server 2110, for example by executing code in the node architecture management module, provides the node architecture functionality described herein, including the management of write transactions directed to the storage server, with retention of the corresponding sequence of write transactions according to the order in which the write transactions are received for any given volume that is presented to one or more of the client devices. In one example, where a stream based representation and management of the write transactions is provided, the node architecture management module 2116 also facilitates the association of the various types of stream images described below to the stream, and access to the stream in order to carry out the presentation and possible retention of corresponding images based upon the described stream images, also as described below.

The node architecture management module 2116 is preferably provided as software, but may also implement hardware, firmware, or combinations of software, hardware, and/or firmware. It may be stored in memory and execute on a conventional processing platform as has been described. The program code of the node architecture management module may also be stored in non-volatile memory including but not limited to hard disks, optical disks, flash drives, or any non-transitory computer readable medium.

FIG. 23A illustrates an example of overhead data 2300a that is used to manage 10 transactions in the node based architecture. In one embodiment, each node may host one or more Data Stores that correspond to where underlying data is stored. A Data Store represents a non-volatile store that may be a disk, a collection of disks, a volume taken from an NMV pool, an entire network managed volume pool, or another node entirely (e.g., a storage domain server). Data Stores are described further below.

The overhead data may also be referred to as metadata. Typically, each write transaction will have a piece of overhead data. Such a write transaction may of course include numerous blocks, meaning that a separate piece of overhead data does not need to be maintained for every single block.

In particular, FIG. 23A illustrates overhead data for a typical write to the node architecture, denoted as "TYPE_WRITE". The overhead data includes an entry for the Block Offset in the corresponding volume, which is the block offset corresponding to the start of the write. Also included is the Length of the Write (e.g., in blocks). This overhead data provides pointers to the start of the write in the volume and the data store, as well an indication of the length of the write. The terms block and offset correspond to one preferred implementation but it should be understood that other techniques for identifying the location and size of the data may be implemented.

There are also one or more entries that respectively include the Data Store identifier and Location information for copies 1 through N of the write transaction.

With the overhead data, the architecture provides for a retainable representation of the full version of the volume at any given time, even after the fact. This allows recovery of the volume at any given time and corresponding to definable level of granularity that will extend throughout the node based architecture. Thus, the system maintains a full record of write transactions down to the granularity of any time "t".

The node architecture offers space reduction in that numerous coherent representations of a volume (at various states) may be retained without requiring numerous instances of all the data on the volume to be replicated for each representation.

It should be noted that the Data Store identifiers may be implemented with a bitmap and per-volume list of data stores. Each node manages the data stores at its local location. However, there is a replication of the overhead data that preferably extends throughout the nodes in the node based architecture described further below.

Figure 23B:
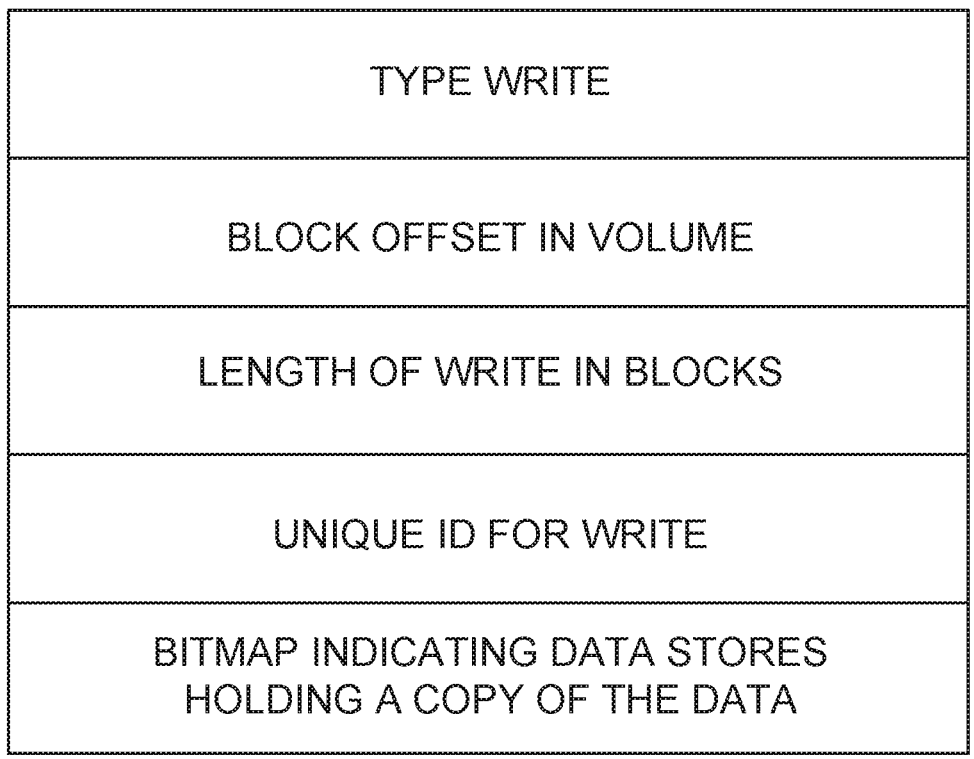
FIG. 23B illustrates another example of overhead data.

The example of FIG. 23A implies a variable sized list of Data Store and Location pairs, but this may be implemented in a more space efficient manner using a Unique Id for each transaction and a known set of Data Stores as illustrated in FIG. 23B (2300b).

As another alternative, the Unique ID for the write is determined directly from the ordering of the metadata. In this example, a separate table of known Data Stores associated with this volume would be used.

During the Write phase the metadata is created to reflect the writes that occur synchronously. For example, if a write is synchronously added to two Data Stores then the list will contain two entries. Once the Synchronous Process associated with the write has completed the I/O can be acknowledged to the host.

A separate Asynchronous Process is responsible for copying the data to additional Data Stores as required and updating the meta-data accordingly.

A Periodic Process is responsible for maintenance of the metadata, including but not limited to the removal of redundant write entries and reducing the number of copies for historic writes.

Figure 23C:
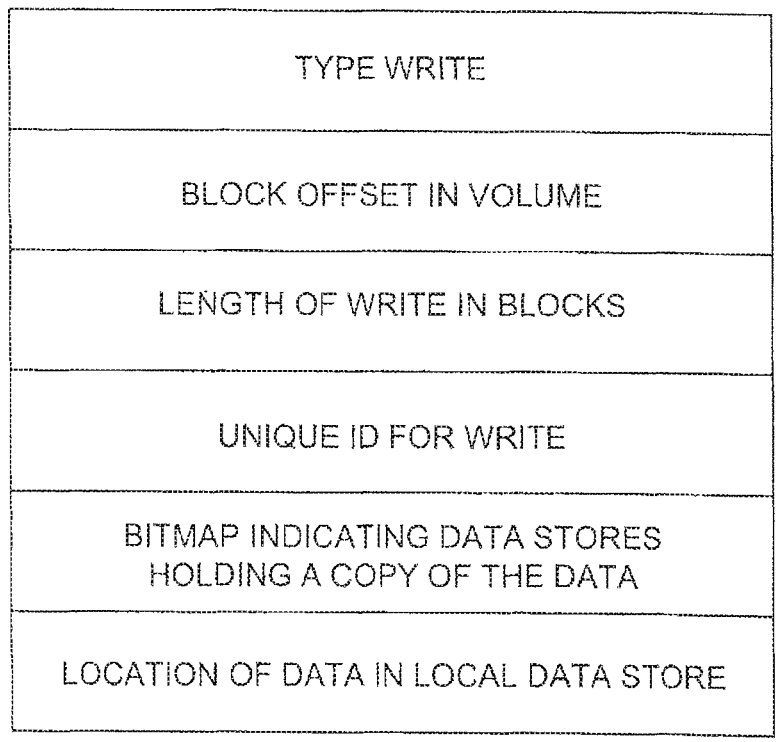
FIG. 23C illustrates another example of overhead data.

FIG. 23C illustrates still another example of overhead data 2300c. In the general case the above description stores (Data Store Identifier and Location within the Data Store) for each copy of the data.

An alternative is to store just a list of nodes (or a bitmap) and have a Unique Id that represents the write transaction (whether expressly or implied). So, the query to another node provides data for Unique Id. This raises the issue of how does the other node translate Unique Id into a specific location within its Data Store. One possible solution is to include the location within the meta-data stored on that specific node (so each node would have a different value in that field of the meta-data) as illustrated in FIG. 23C. However, an issue that arises with this solution is it assumes that a given node will only have one copy of the data, which may not be desirable. Accordingly, it may be preferable to keep the overhead data defined in terms of the list of (Data Store Identifier and Location within the Data Store) pairs.

Figure 22:
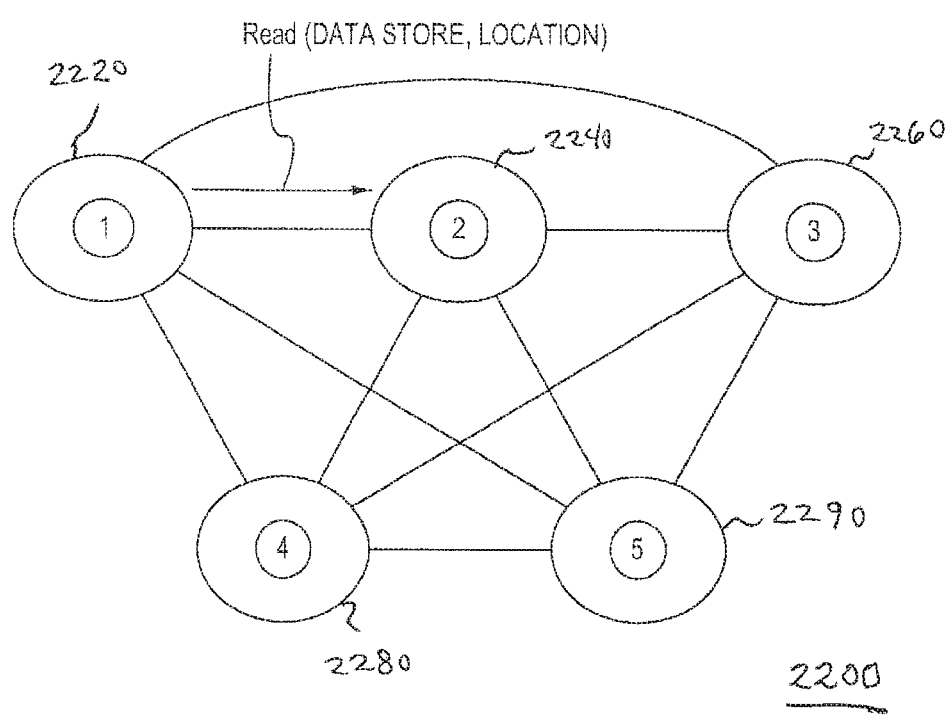
FIG. 22 illustrates an example of a node architecture and constituent nodes.

FIG. 22 illustrates an example of a node architecture and constituent nodes (2220, 2240, 2260, 2280, 2290). Although five nodes are illustrated, greater or fewer nodes may be provided depending upon the application and other considerations.

Referring to FIGS. 22 and 23A-C together, essentially the system records the node identifier for each copy of the write. Additionally, in one example, instead of per-volume mirror mappings among the nodes, a per-node interconnect among the nodes may be provided as illustrated.

In one example, IO operations are carried out as follows.

For read transactions, when the IO request arrives, the overhead data is accessed to determine which node(s) the data is on and the IO is issued. This may be based upon various criteria, such as highest performance source based upon locality and class of service.

It is noted that a disk block cache may be provided at one or more of the nodes, and that such a cache may be used to satisfy read requests. A "primary" node that manages the storage of the underlying data remains identified in the overhead data, and volume coherency is retained because the overhead data extends throughout the system. Thus, the node provides immediate (cache) responsiveness to the read without compromising the coherency of the volume to which the read is directed.

For write transactions, since any given node has a coherent representation of the virtual volume, the write may be directly made at the node receiving the request (with the overhead data updated accordingly).

Of course, mirroring may be implemented, such that the write is also copied to another node. However, from the perspective of the host, the IO transaction is simply directed to the virtual volume presented by the node, without concern as to where the data is actually ultimately stored. Additionally, if a node acting as a mirror is down, another node may be used as a second instance of the written data. There are thus two stable copies of the data underlying the write transaction and there would be no need to do volume recovery later. Still further, if the node acting as the mirror returns to service, the second copy may be instantiated at that node, and the overhead data updated accordingly.

FIG. 24 illustrates an example wherein a first node might be formally mirrored to a second node in a traditional sense. With the node architecture, even if the mirror node 2 goes down, the overhead data (metadata) is replicated at each node. Thus, the third node may temporarily act as the mirror while the second node is down. The metadata in the stream allows the node location to be correlated to each write transaction.

Figure 26:
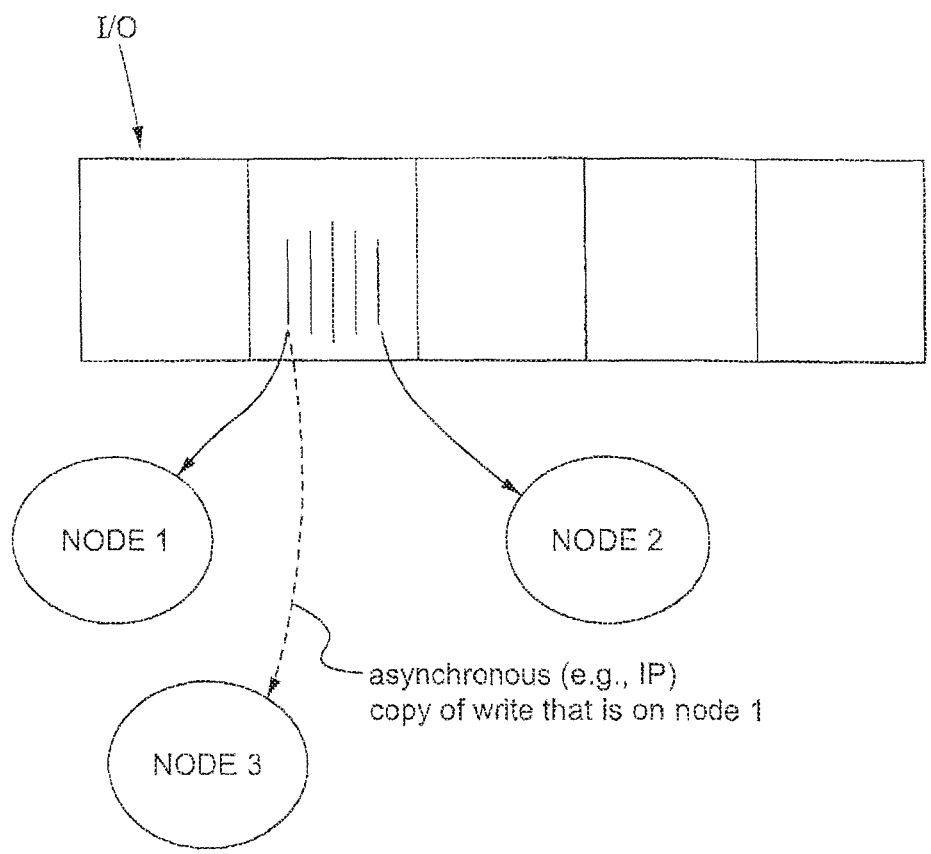
FIG. 26 illustrates making an asynchronous copy of a write transaction to another node.

FIG. 26 illustrates an example wherein a node may be used as an asynchronous back up. The node architecture would normally respond to IO transactions (e.g., to node 1) as described above and may also be mirrored. In the background, a given write transaction may also be asynchronously copied to another node (e.g., to node 3). This may be performed over a normal network connection, if desired. This allows a further copy without taxing responsiveness to IO transactions.

Nodes do not need to be homogenous (although in some enterprises, they may be). As introduced in connection with FIG. 21 above, the nodes may be a specific pod representing a specific pool of storage resources. Additionally, a specific group in an enterprise may have default designation to a given node. In this fashion, nodes may be arranged to have class of service to give priority to faster or slower data.

In one option, although not preferred, the client devices may also be mapped to all of the nodes, with client-side decoding of the overhead data at the issuance of IO transactions.

In an example implementing the stream architecture described further below, the node architecture is useful in that data is not overwritten (it's retained in the stream). Thus, replaying missing IOs may be used for recovery. Various other useful storage management functions may also be implemented including taking snaps, snaps of snaps, performing rollbacks, overlays of data.

Additionally, since volume coherency extends across all of the nodes, the storage management features can be implemented at another node when one node is down. For example, a snapshot may be on a node different from the node handling the corresponding data source. This allows the snapshot to keep running even if the data source node is down.

Basically, any state can be replicated at a level of granularity that may be defined by the user.

Figure 25:
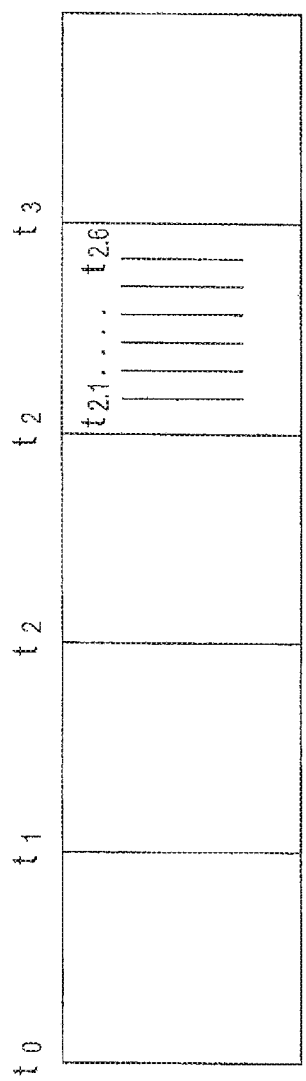
FIG. 25 illustrates an adjustable level of granularity for a sequence of write transactions.

FIG. 25 illustrates how the node architecture is configurable to have a definable, adjustable guaranteed level of granularity at which write transactions are fully recorded for any of the above-described storage management functions. That is, a time period may be defined (e.g., one second, one minute, one day, etc.), with that time period dictating the level of granularity for which the overhead data is guaranteed to be present throughout the node architecture. This is depicted at t0, t1, t2, t3, etc. in FIG. 25. Below that level, there may be local write transaction sequences that pertain to shorter time intervals (t2.1, t2.2, t2.3, etc.) on a given node, with the corresponding sequences on another node not necessarily duplicating the sequences on the given node.

It should be noted that some data management functions could be limited to the guaranteed level of granularity. For example a recovery might only be able to guarantee going back to one of the main time milestones (t0, t1, t2 . . . ) and not some time in-between.

Optionally, for space management, the history of write transactions below the guaranteed granularity may be selectively pruned on some nodes. That is, it may be accepted that the full history of write transactions for a given node will only be retained on that given node, with no mirroring.

It should also be noted that the overhead data, or portions thereof, may be updated to change the level of granularity. For example, a maintenance process may "clean up" older data to remove what is considered to be an unnecessary level of detail in the overhead data, with corresponding savings but also some corresponding loss of the ability to go back to any given point in time.

Of course, the system may be designed so that all write transactions on all nodes are coherently recorded in identical form, if desired.

As described above, the node architecture is configurable to provide H/A mirroring for a shared pool, and no loss of write-back on H/A writes when a node goes down. It also supports N-way copies of data maintained per-write, for easy re-synchronization. CDP is also supported on shared pools. It allows de-dup across nodes, volumes and/or pods, as well as replication of complete snapshots states (down to the guaranteed level of granularity globally). It also allows flexible migration of data among the nodes for load balancing across nodes, with no loss of volume coherency.

Various commands are also rendered easier to carry out under the node architecture. For example, a copy command is easily carried out by mapping to the same data blocks—no actual copying required. Additionally, for a trim command, instead of trying to trim down the stack of overhead data, a zero write may be recorded. There, the original data is preserved and the history is truncated.

In one example, the node architecture implements a stream architecture for data representation. The architecture supports layering and is suitable for composition in various ways. That is, the architecture is organized around building blocks that may be combined in many different ways, to solve different storage challenges.

A data store (or "store") refers to a pool of storage. This can, for example, be a disk, a RAID LUN, an aggregation of disks or LUNs, etc. This is where the various data described herein may be stored in a persistent manner.

A stream is a readable and extendible history of all of the writes. A stream may begin at a time "t" and end at another later time. A stream may be referred to as "active" or "open" when it can still be written to.

An image is a representation of data in a volume that is made by reference to the stream. An image can be thought of as a "view" or an "index" into a stream, to facilitate certain types of accesses. The image may be generated by referencing overhead data within the stream. The image may be stored for future use, or may be generated on demand, by referral to the stream including the overhead data therein. There are different kinds of images: a full image [written FullImage(t)], a sparse image [written SparseImage(t1,t2)], and a Meta image [written MetaImage(t1,t2)]. An image may be thought of as a time-based representation of a volume in the stream.

A volume is the unit of presentation to client devices. Client devices see and interact with volumes as their storage resources. Consistent with the stream architecture, volumes may be composed of streams, images, and/or other volumes.

Volumes are a container by which new storage devices may be built from compositions of images, streams, and other volumes.

Stream Architecture

Figure 1:
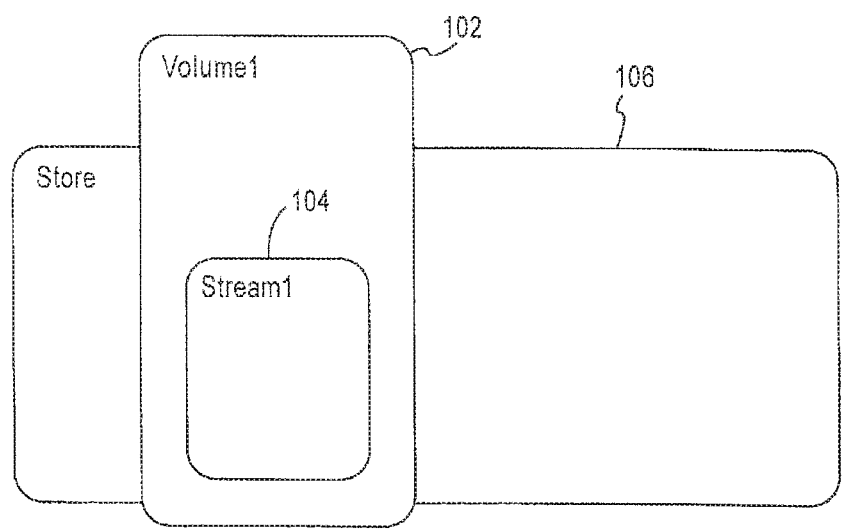
FIG. 1 is a block diagram illustrating an aspect of the stream architecture, particularly the relationship of a volume and corresponding stream and data store.

FIG. 1 is a block diagram illustrating an aspect of the stream architecture, particularly the relationship of a volume 102 and an associated stream 104 and data store 106. The volume 102, implemented by the stream 104, appears like a normal disk device to a client device.

A data store 106 may be thought of as the substrate of data storage where objects implemented in the architecture reside and persist. The data store 106 may be constituted of physical media or may also be a virtual disk (which, in turn, may have corresponding underlying physical storage, provided otherwise). The data store 106 is intended to conceptually illustrate such a substrate, but it should be understood that it is not necessarily a single monolithic storage entity. Rather, the underling data store 106 may comprise an underlying hierarchical organization of storage, physical and/or virtual.

It is also noted that where physical storage resources are implemented, they may be variously embodied, including but not limited to hard disks, optical discs, tape, solid state memory, etc.

The stream 104 may implement any form of simple or complex data structure, including but not limited to tree structures, queue and stack structures, maps, etc.

The stream 104 is created from the underlying data store 106. A client device sees the volume 102 as a disk for the purposes of storage transactions, and interfaces with the volume 102 with respect to IO transactions without requiring the client device to have information regarding the stream 104.

A volume 102 has the characteristics of a "normal" block device. It behaves like a disk in that it is block level oriented and is readable and writable. That is, when a client device writes "a" to block 0 and later reads block 0, the client device receives "a". When a client later writes "f" to block 0 and then reads block 0, the client receives "f" in response to the read, not the previously stored "a". However, the stream 104 includes additional functionality and characteristics beyond those of a normal block device such as a disk.

It is further noted that in FIG. 1, as in other figures of the same type in this description, the stream 104 is not encapsulated within the volume 102. The intent is to illustrate that the volume 102, which is accessible as a normal volume 102 by a client device, has an associated stream 104, with the stream 104 having the underlying data store 106 as a storage resource foundation.

Figure 2:
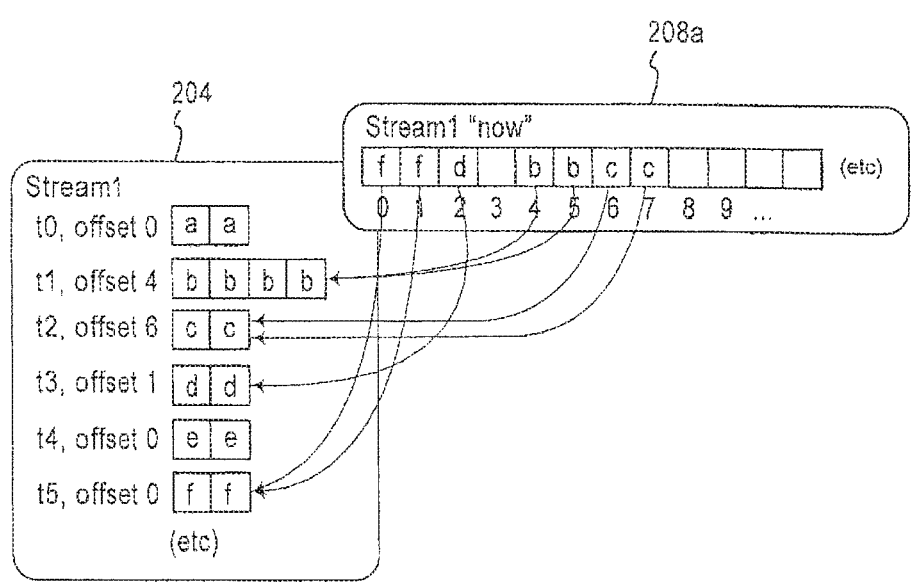
FIG. 2 is a block diagram illustrating a stream and associated stream image.

FIG. 2 is a block diagram illustrating a stream 204 and associated stream image 208a, corresponding to a volume such as the volume 102 depicted in FIG. 1. This example illustrates how the stream 204 records changes and implements random read access for the "now" version of the volume accessible by a client.

The stream 204 preferably maintains a recording of all changes to the volume. Additionally, if a block has never been written, then it defaults to all 0's (empty blocks in the stream 204 as shown). It should be understood that other default statuses, including but not limited to all 1's may be provided for blocks that have not been written.

For example, as indicated in FIG. 2, at t0 two blocks "a" are written to the volume and thus are also written to the stream 204 starting at offset 0. At this time t0, the image 208a is updated to reference the fact that the two blocks "a" are written to the stream 204. In this fashion, the offset 0 block and offset 1 block of the image 208a would indicate "a" and "a" at time t0. However, this is not depicted in the "now" version of the image 208a because there were overwrites to blocks 0 and 1 subsequent to time t0.

The recording of writes in the stream 204 and corresponding referencing by the image 204 continue to be updated as writes occur. For example, at time t1 the stream 204 records four blocks depicted as "b" starting at offset 4; at time t2 the stream 204 records two blocks depicted as "c" starting at offset 6, and so on as depicted in FIG. 2.

Each time the stream 204 records a write to the volume, the image 208a is updated so that it references the stream 204 accordingly. In this fashion, the stream 204 maintains a recording of changes to the volume, including data that is ultimately overwritten, but the image 208a contains references that collectively represent the entire state of the volume at time t. In particular, the depicted "now" version of the image 208a represents the volume as of the last write (here, t5).

Thus, the image 208a and the corresponding stream 204 can be used to recover, replicate or provide any variety of storage management functions for the corresponding volume at any given time t up through the time "now". It should be noted the stream image 208a may be "saved" at any time where such is desired, or may also be generated by accessing the stream 204 after the fact (e.g., at time t5, without having retained the image for past time t3, one can retroactively generate an image for time t3).

Each change in the stream may have associated overhead data, which may also be referred to as metadata. Typically, each write transaction will have a piece of overhead data that is provided in the stream. Such a write transaction may of course include numerous Blocks, meaning that a separate piece of overhead data does not need to be maintained for every single Block. This reduces overall overhead.

As such, the architecture provides for a retainable representation of the full version of the volume at any given time, even after the fact. The stream 204 allows recovery of the volume at any given time, and the image 208a compliments the stream 204 by providing a full representation of the volume at any time "t".

The stream and image scheme itself offers space reduction in that numerous instances of the image may be retained without requiring numerous instances of all the data on the volume to be replicated for each image.

Figure 3:
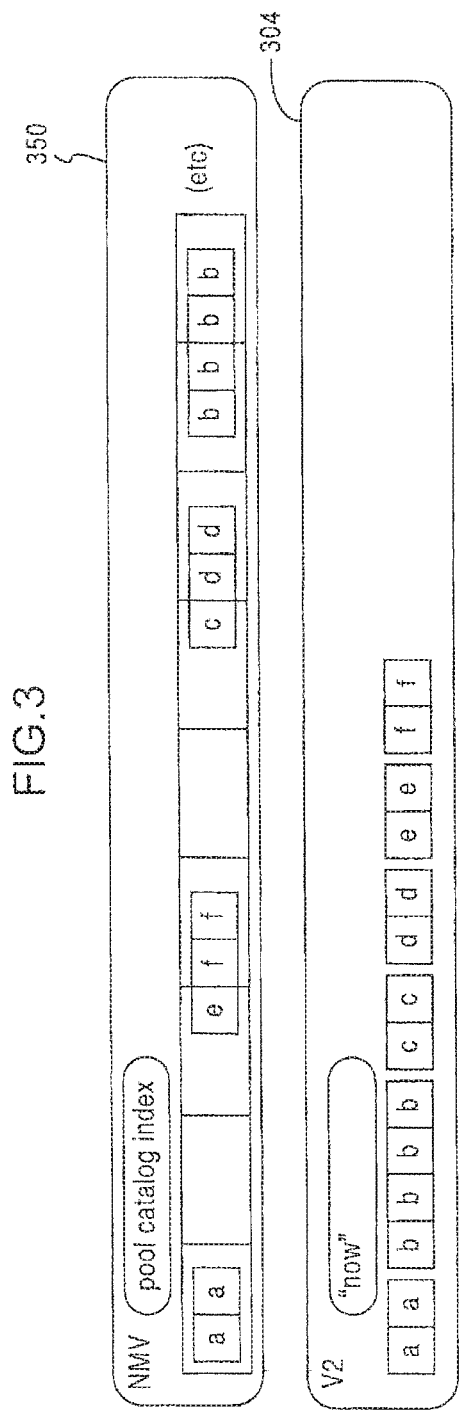
FIG. 3 is a block diagram illustrating a comparison of how a thinly provisioned virtual volume may organize writes as compared to the stream architecture.

Additionally, the stream itself provides space reduction. FIG. 3 is a block diagram illustrating a comparison of how a thinly provisioned virtual volume, which may be referred to as a "Network Managed volume" (NMV) 350 may organize writes as compared to the stream 304 architecture. The stream 304 architecture stores only what is written, and some overhead data, and in most circumstances uses less disk space than an NMV since the writes can be packed sequentially. In FIG. 3, the same series of writes is illustrated as scattered on an NMV volume 350, and packed sequentially on the stream 304. Writes are often scattered, and in thin provisioning schemes this prompts numerous allocations of storage allocation units (SAUs) "underneath" the block locations of the writes. This potentially can waste space. However, the stream architecture writes may be appended to the history in the stream 304, allowing more efficient space utilization.

The overhead data takes up some space, but it is a small fraction of the data payload.

Additionally, a stream stores information for writes to blocks that are subsequently overwritten (e.g., as in FIG. 2, and as in FIG. 3 wherein part of the "e" write was overwritten by the "f" write). This uses additional storage space; however, this additional storage is not "wasted" space. It has value, including provision for after the fact recovery as well as other features described further below.

When the stream architecture uses an appended storage operation, this can have performance implications, since appending writes to the stream create a sequential write pattern in the backend store, regardless if the client write pattern is random or sequential. This allows the opportunity to take full advantage of the data store bandwidth (RAID "full stripe writes", large transfer sizes, aligned to storage media, etc). However, there may be a tradeoff as the overhead data should be maintained to quickly locate a requested block, and individual Read operations may become slower.

Additionally, caching can be used to amortize any cost imposed by the allocation scheme used by or in the stream.

The stream architecture may optionally implement an append scheme wherein when a space is overwritten on a stream architecture volume, there is no overwrite in the associated stream. Instead, there is an append to the stream. This means that the stream may be embodied as a data structure, which can exist on Write-once media. This also means that the stream itself can be a type of Write-once media. That is, in some embodiments the stream architecture can be used to implement WORM devices.

It is noted that appending each write transaction to a single store is certainly not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. This maintenance of the sequence of write transactions may be performed within the stream itself, via the overhead data. Additionally it is noted that the overhead data may be separately stored.

Figure 4:
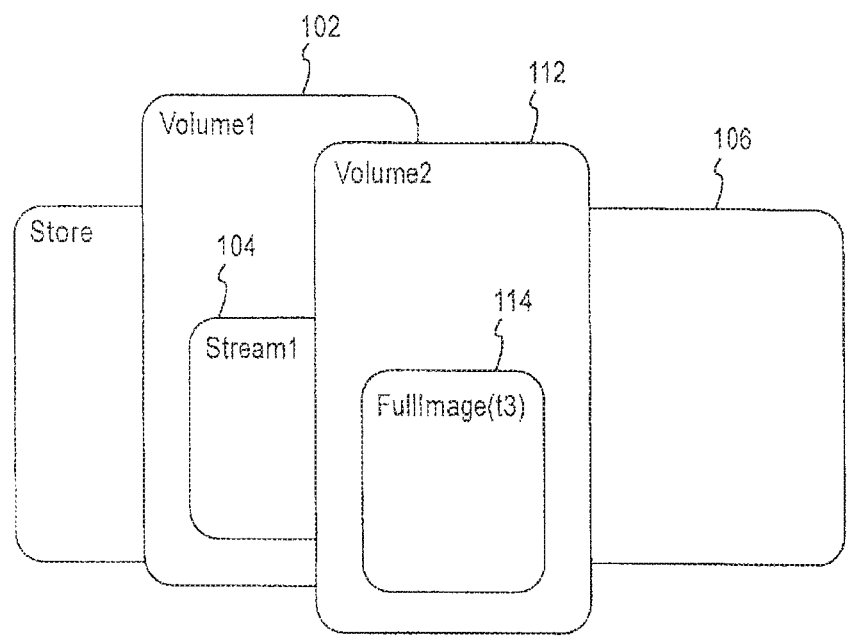
FIG. 4 is a block diagram illustrating another aspect of the stream architecture, particularly the relationship of multiple volumes and different forms of representation of the volumes.

FIG. 4 is a block diagram illustrating another aspect of the stream architecture, particularly the different forms of representation for multiple volumes. Consistent with FIG. 1, the relationship of a volume 102 and associated stream 104 and data store 106 are illustrated. Additionally, another volume 112 presents a full image at time t3, denoted FullImage(t3) 114.

This new volume 112 presents the image of time t [written FullImage(t)]. This image "points" into a part of the stream that contains the history of writes on the original volume up to time t. That is, it represents the volume as it was at time t, even if the volume has experienced additional writes since that time. The image is a read-only representation of the volume that may be retained for future access.

Figure 5:
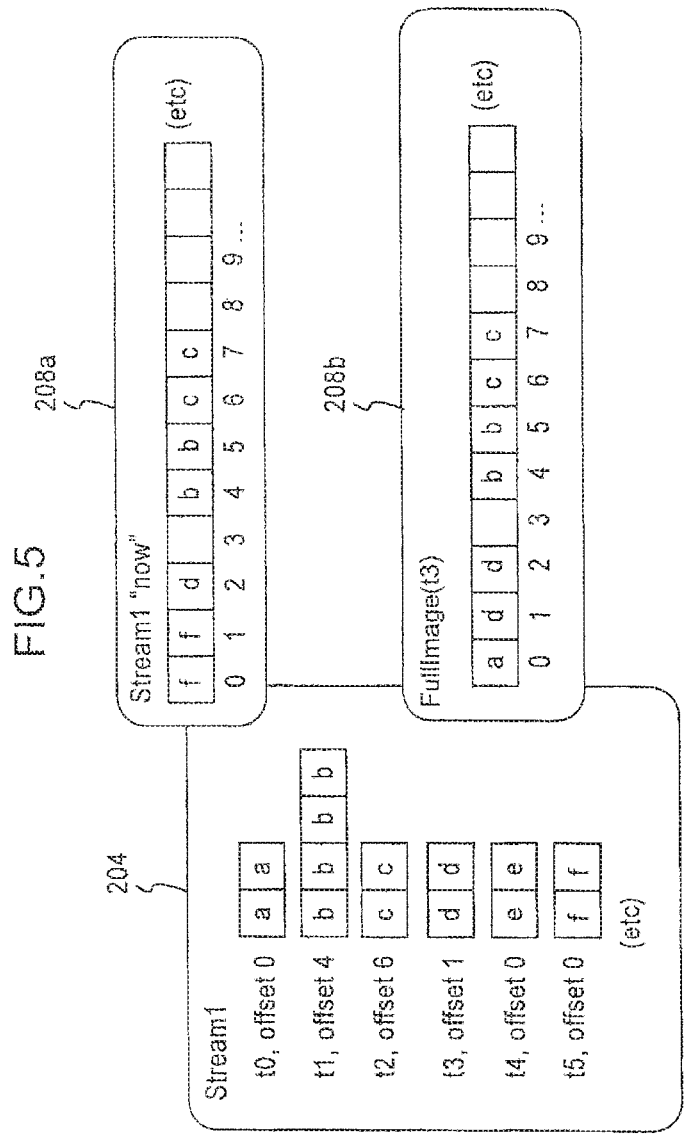
FIG. 5 is a block diagram illustrating a stream and stream indices associated to an original volume and an additional volume.

FIG. 5 is a block diagram illustrating a stream 204 and associated stream Indices 208a-b, corresponding to the original volume 102 and another volume 112 depicted in FIG. 4.

Image(t3) 208b is a type of stream image that shows what the volume looked like at time t3, even while the original stream 204 still continues to represent "now", the current version of the original volume 102. Both stream Indices 208a-b point back into the original stream for the data. They preferably do not contain copies of the data itself.

The stream Architecture does not require preservation of an image for any time t in order to acquire a full representation of a volume at that time. This is in contrast to a disk "snapshot" which is snapped at a given point in time and is then preserved. Instead, the full image may be created at some time later than t. Additionally, this new volume 112 can be presented and accessed even while the originating stream is still "active" (still being written to by a client).

FIG. 5 also illustrates that the stream Architecture can provide both CDP and snapshot capabilities. The stream 204 records activity to the volume. Additionally, as noted above, at any time t recorded in the stream 204 one can access a full image of the volume as it existed at that time t. Additionally, if a FullImage(t) at time t is created, it is then a snapshot of the volume at time t. While this is occurring, the stream 204 remains available for continued writes to the original volume 102 and continues to append writes for that volume 102.

The stream Architecture also avoids copy-on-write migration penalties that may be present in traditional snapshot techniques. That is, for a snapshot, when a client writes to a block, the snapshot system may need to migrate the "chunk" containing that block somewhere else first, in order to preserve the point-in-time contents of the block. By contrast, the copy of the data that is used to represent the point-in-time volume remains untouched in an earlier part of the stream 204 and does not require subsequent housekeeping.

Figure 6:
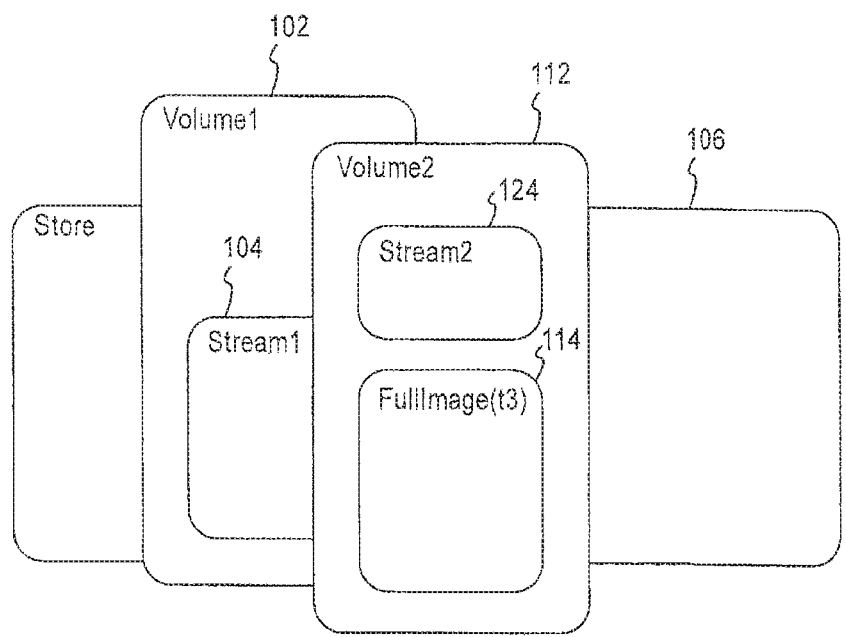
FIG. 6 is a block diagram illustrating that a point-in-time snapshot volume can also be a read/write volume.

FIG. 6 is a block diagram illustrating another aspect of the stream architecture, particularly how a volume can be treated as both a read/write volume and a point-in-time snapshot. The relationship of a volume 102 and corresponding stream 104 and data store 106 are again illustrated, as is the volume 112 that presents a full image at time t3, denoted FullImage(t3) 114, as well as a corresponding additional stream 124.

In FIG. 4, the volume 112 with the FullImage(t3) 114 was considered a read only volume. Here, however, the inclusion of additional stream 124 renders volume 112 a read/write volume. This can be referred to as layering a stream 124 "on top of" the FullImage(t3) 114. This new stream 124 records changes that are made to the FullImage(t3) 114 volume. In other words, the stream 124 records all of the changes that occur to the original volume using the representation of FullImage(t3) as a baseline. This provides a writable point in time volume, or a R/W Snapshot at time t3, in that the FullImage(t3) represents the point in time volume at time t3, and the overlaid stream 124 offers various additional representations including representations entailing the writes following the point in time.

Figure 7:
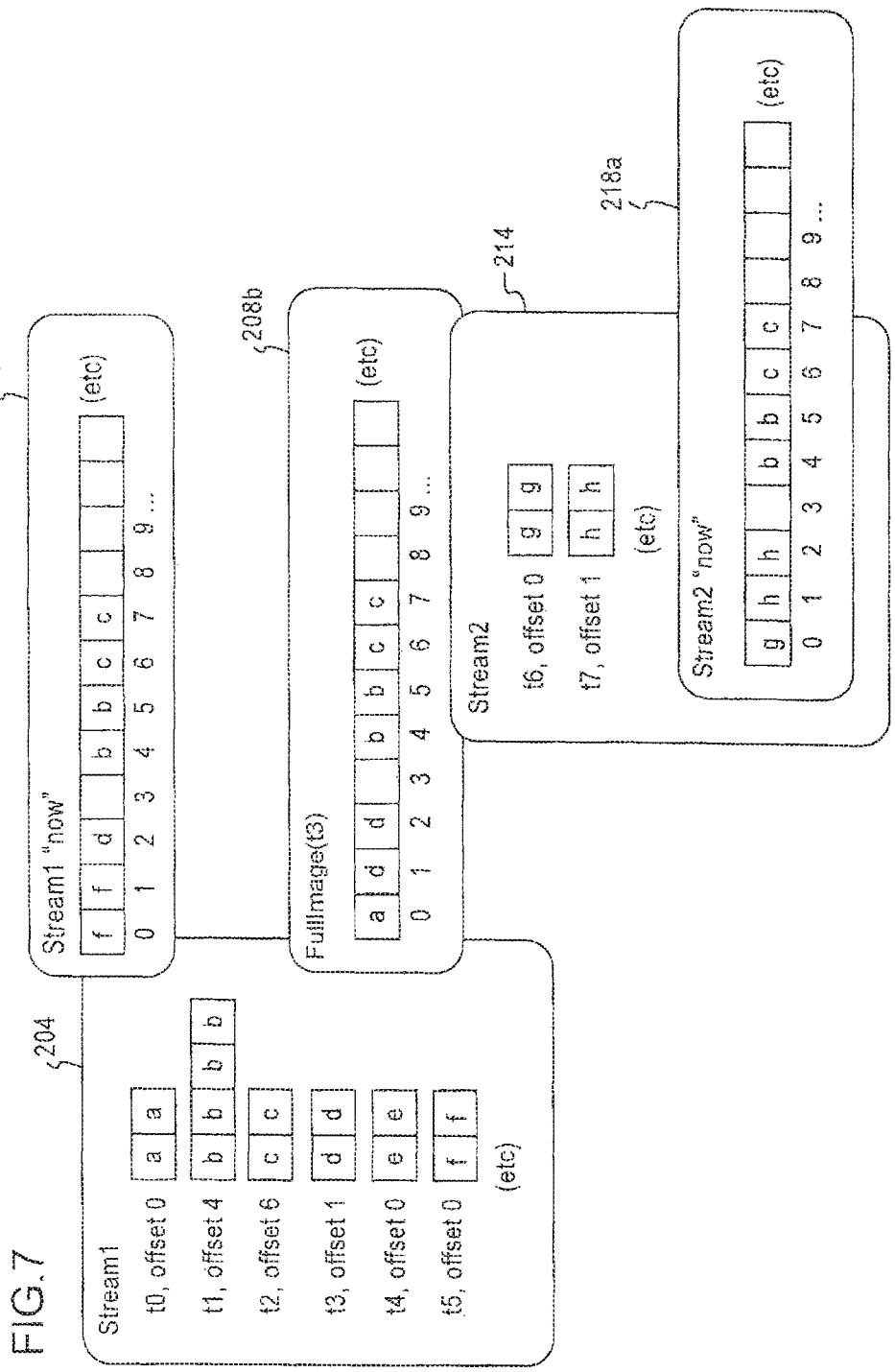
FIG. 7 is a block diagram illustrating a stream and associated stream indices, as well as another stream having an associated stream image.

FIG. 7 is a block diagram illustrating a stream 204 and associated stream Indices 208a-b. It also further illustrates layering of another stream 214 having an associated stream image 218a onto a previous representation.

As has been explained, a client device writes to the original volume from time t0 to time t5, and then the stream Architecture is invoked to create a FullImage(t3) 208b. This provides an image of the original volume as it existed at time t3.

Another stream 214 is then created on top of, or layered upon, the FullImage(t3) 208b. This stream 214 has an associated "now" image 218a just as the first stream 204 does.

Reads from the new volume use an image 218a that may reference both the original stream 204 and the new stream 214. Writes to the new volume are simply appended to the new volume's stream 214. Writes to the original volume are simply appended to the original volume's stream 204, which does not affect the new stream 214.

As can be seen in FIG. 7, the stream architecture and its supported layering allow the blocks in offsets 4-7 ("b", "b", "c", "c") to appear in the "now" image 218a even though stream 214 records only changes to offsets 1-2. FIG. 7 also further illustrates how layering supports provision of a R/W snapshot as explained for FIG. 6. Specifically, the FullImage (t3) 208b is retained (or generated after the fact) as an archived image from the first stream 204, and the second stream 214 records changes thereafter. It should be understood that the layering may continue. For example, a full image of the second stream 218a may be taken at time t7, and then a new third stream may be layered on top.

Figure 8:
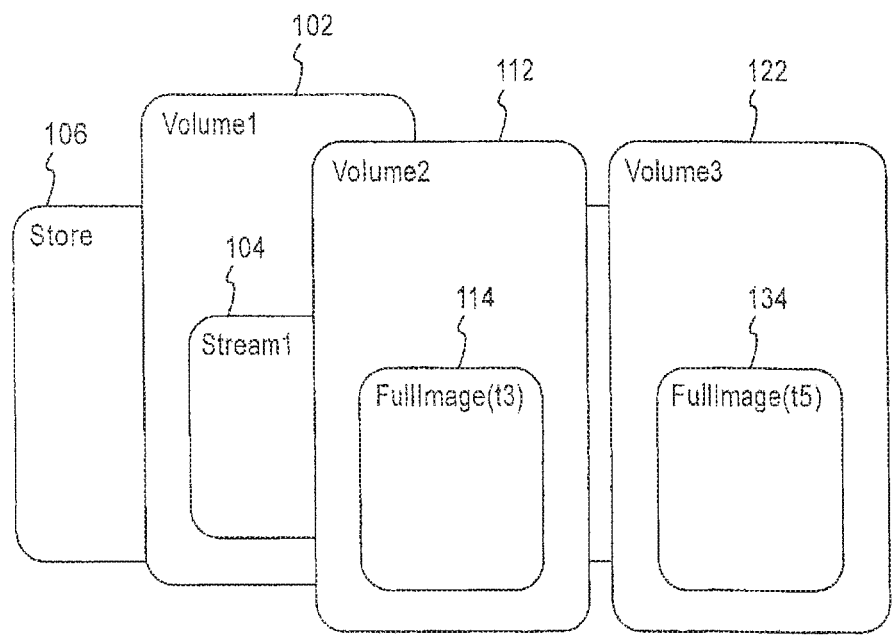
FIG. 8 is a block diagram illustrating that multiple images may by presented from a stream.

FIG. 8 is a block diagram illustrating another aspect of the stream architecture, particularly that multiple images may be presented from a stream. The relationship of a volume 102 and corresponding stream 104 and data store 106 are illustrated. Additional volume 112 presents a full image at time t3, denoted FullImage(t3) 114, and additional volume 122 presents a full image at time t5, denoted FullImage(t5) 134.

FIG. 8 illustrates a variation on FIG. 4, which indicates presentation of a single FullImage(t) from a stream. Here, multiple Images, namely FullImage(t3) 114 and FullImage (t5) 134 are presented from a stream. This is notable in that it does not require additional data space. Since the originating stream contains the data, the Images are small "indexes" of the original stream. The Images may use space for overhead data, but again this is a small fraction of the space required in the original stream.

Figure 9:
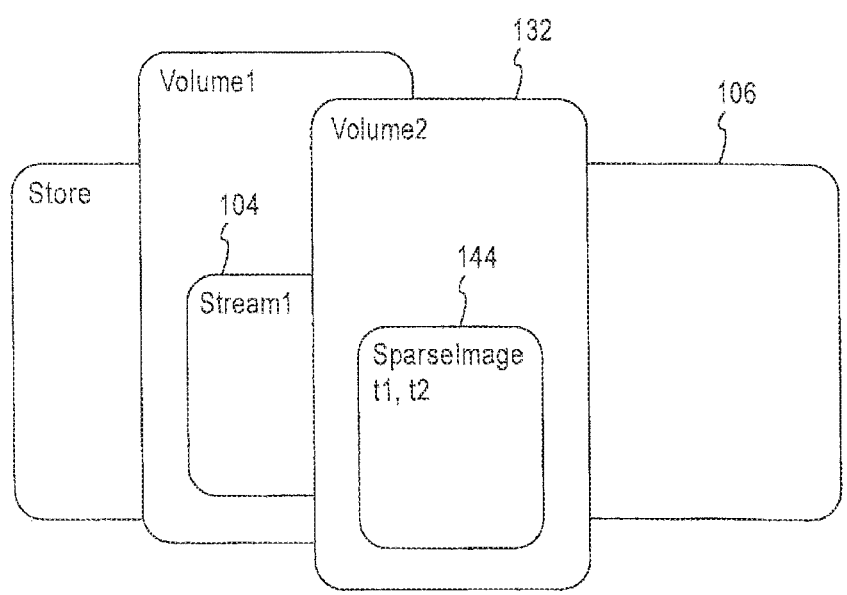
FIGS. 9-11 are block diagrams illustrating sparse image volumes and indices implemented by the stream architecture.

FIG. 9 is a block diagram illustrating a sparse image (144) implemented by the stream Architecture, and another example of an additional volume 132. A sparse image is another example of a stream Image, but represents the "end result" of changes recorded in a stream between a first and second time recorded in the stream. An example, between time t1 and time t2, is denoted as SparseImage(t1,t2) 144. This SparseImage(t1,t2) 144 does not describe the history of changes between t1 and t2 (it eliminates overwrites, for example), and does not describe any history before t1 or after t2.

Figure 10:
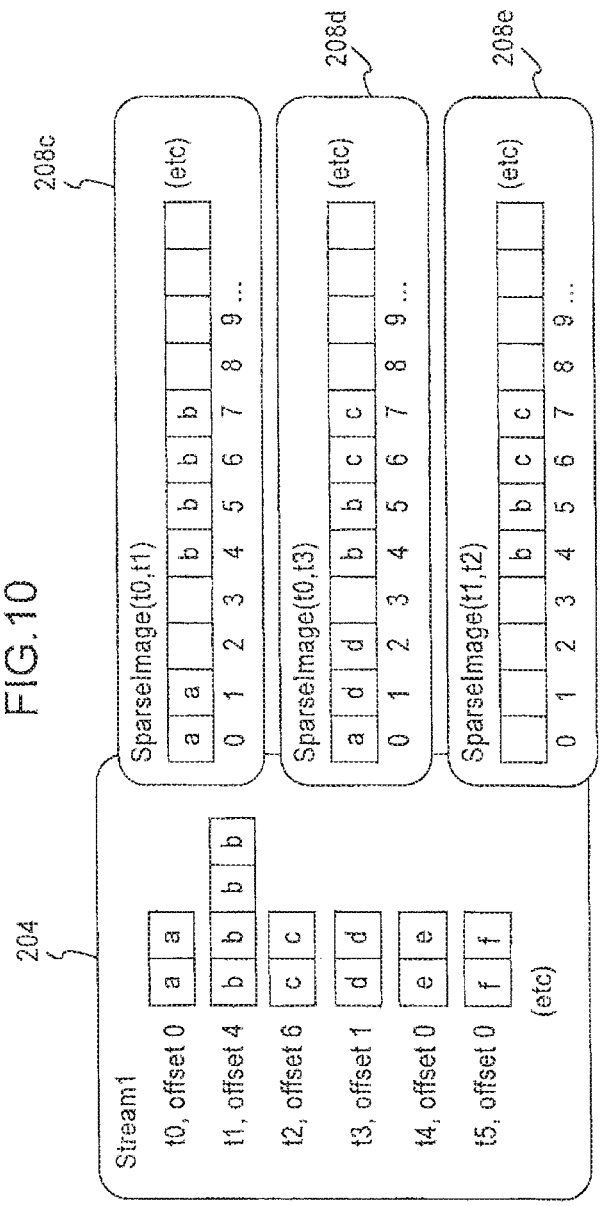

FIG. 10 is a block diagram illustrating a stream 204 and associated stream Indices 208c-e, which in this example are SparseImage(t0,t1) 208c, SparseImage(t0,t3) 208d and SparseImage(t1,t2) 208e.

The stream 204 has recorded t0, t1 t5, and contains overwrites. For example, the write at t2 overwrites changes made by the write at t1, and the write at t3 overwrites the changes made by the write at t0. With the sparse image, the "end result" is only retained, and portions of the stream "outside" the times of the sparse image are not described (empty). For example, the SparseImage(t0,t3) 208d reflects the overwrites through time t3 (e.g., the "d" in block 1 has overwritten the "a" in block 1 from time t0. Additionally, the SparseImage(t1,t2) 208c illustrates how the writes of times t0 and t3-5 are not represented, and how only the end result of the overwrite at time t2 is represented in the Image.

Figure 11:
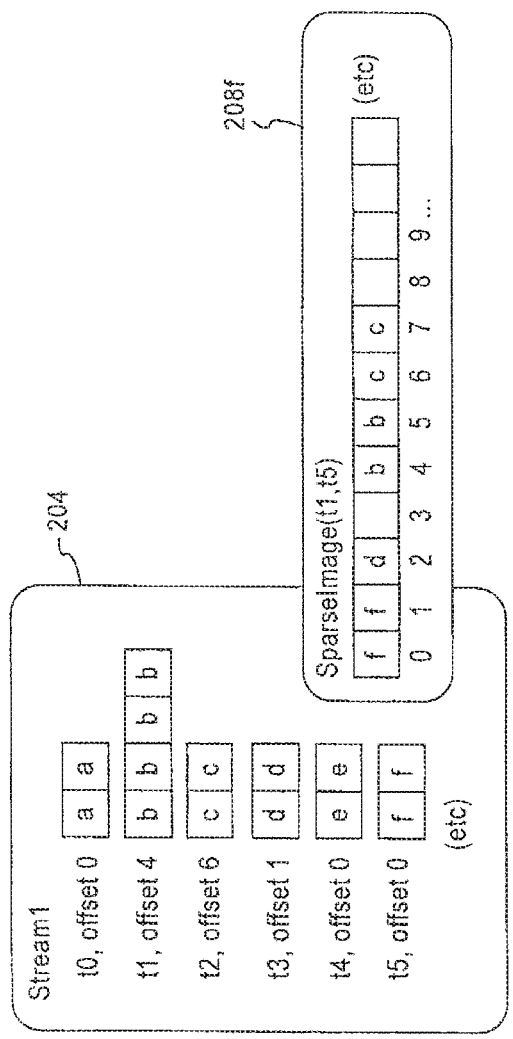

A sparse image is a form of image with additional usefulness beyond the "now" image and Full Image. FIG. 11 illustrates another example of a SparseImage(t1,t5) 208f.

Consider a sparse image as it relates to mirroring, with a volume being mirrored from local to a remote. Assume that the link goes down at t1 and the local site keeps receiving changes (recorded in a stream), with the remote site stranded at t1. If the link comes back up at t5, the mirroring needs to appraise the remote site as to the missing information from t1 to t5.

In this situation, the stream could be "replayed" to send over all of the changes "verbatim", but this would replay overwrites. Instead, a SparseImage(t1,t5) 208f is determined and then is "walked" in block order. Block 0 is 'f', block 1 is 'f', block 2 is 'd' The sparse image allows a corresponding update on the remote to skip the "holes" (the empty boxes), as well as the overwrites, moving only the "end result" over to the remote site. The sparse image may be used for both synchronous and asynchronous mirrors.

Additionally, the SparseImage(t1,t5) 208*f* can be used to undo from t5 to t1. Here, an original or "first" volume1 may have been updated from t0 through t5, and another "second" volume2 may merely include updates through t0. Assuming that one wants to "undo" the changes on the original volume, making it identical with the second volume, the SparseImage(t1,t5) 208*f* may be used for instruction as to which data should be fetched from the volume.

For example the sequence may be as follows: (1) Block 0, read block 0 of volume2 and write to block 0 on volume1. Now volume1 block 0 is t1; (2) Block 1, read block 1 of volume2 and write to block 1 on volume1. Now volume1 block 1 is t1; (3) Block 2, read block 2 of volume2 and write to block 2 on volume1; (4) Skip Block 3; (5) Block 4, read block 4 of volume 2; etc.

Figure 12:
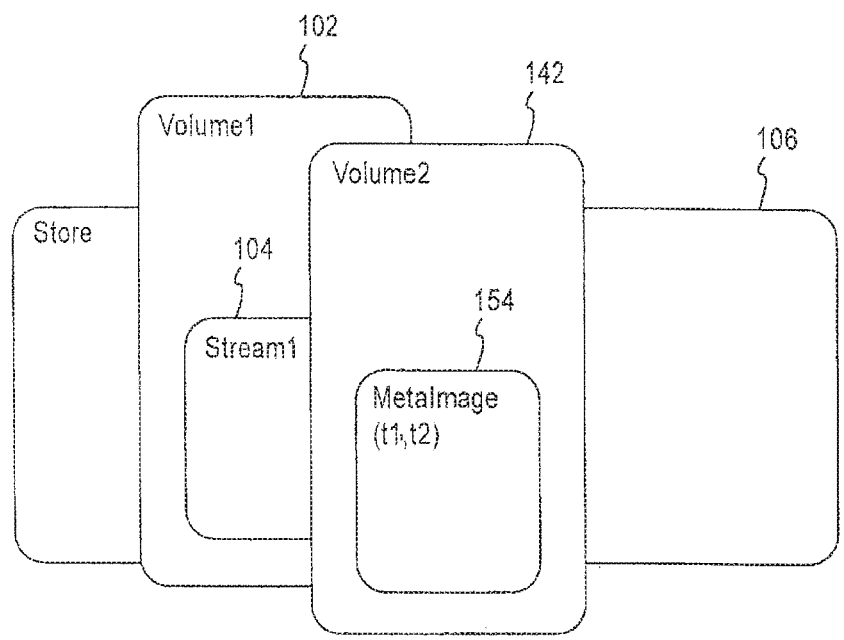
FIGS. 12-13 are block diagrams illustrating meta image volumes and indices implemented by the stream architecture.

FIG. 12 is a block diagram illustrating a "MetaImage" 154 and an associated volume 142 implemented by the stream architecture. A meta image 154 gives a more or less direct "view" into a stream. Unlike the sparse image, the history is preserved in the meta image 154 representation. Through the meta image, the stream architecture provides the list of changes recorded in a stream between two points in time. Overwrites and timestamps are included.

The previous examples of data representations provide, for example, full or sparse representations of data in a volume. The meta image 154 differs in that it represents historical information concerning changes to the volume, rather than the data itself.

Figure 13:
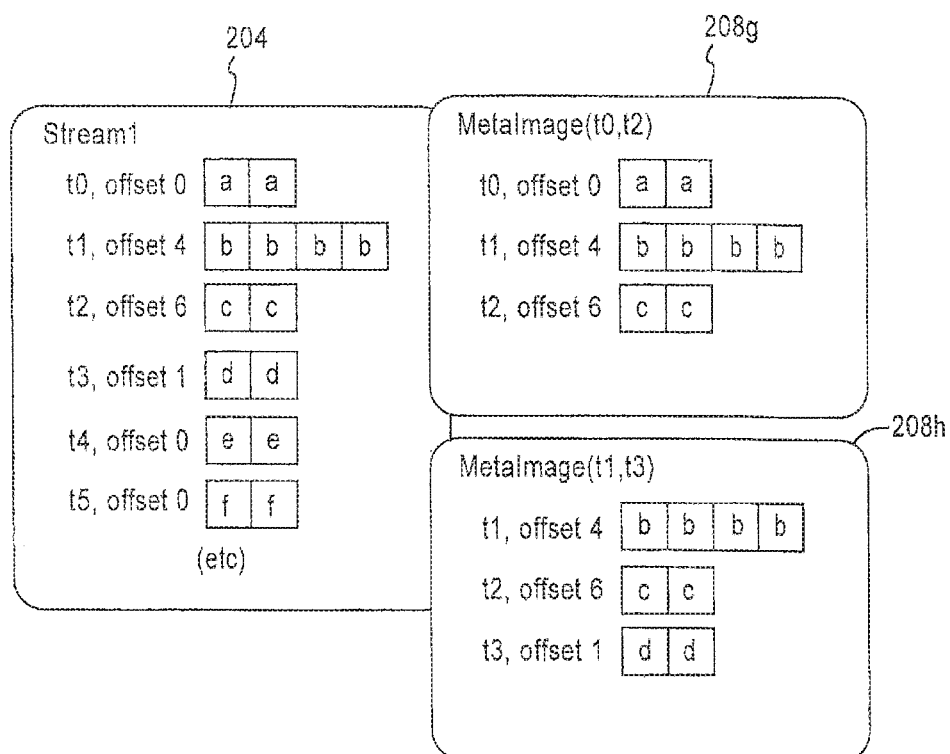

FIG. 13 is a block diagram illustrating an example of a stream 204 and corresponding meta image indices, particularly MetaImage(t0,t2) 208*g* and MetaImage(t1,t3) 208*h*. On the surface, the meta image looks like a stream. However, they do not contain data like streams. They appear to contain data, because they reference the original data in the original stream. Specifically, the meta image indices contain a referential sequence of all of the changes to the associated volume between a first point in time and a second point in time. MetaImage(t0,t2) 208*g* thus includes a reference to the writing of two blocks "a" at time t0 starting at offset 0, a reference to the writing of four blocks "b" at time t1 starting at offset 4, and a reference to the writing of two blocks "c" at time t2 starting at offset 6.

Because of its configuration, the meta image can replay a sequence of changes "verbatim". By contrast, a sparse image does not support this function, because the sparse image doesn't preserve the sequence of changes, only the "end result".

Another example is CDP. When a user wants to create an image from a stream, he might be presented with a GUI dialog to allow him to pick a point in time. The stream architecture facilitates the synthesis of historical views of the stream that may be shown through the GUI. For example, the GUI dialog may be generated by creating a meta image to use as the basis for presenting a selection mechanism. Corresponding overhead data allows generation of a list of timestamps for each of the changes. This supports illustration of "gaps" where no writes were made for a minute or some significant period of time, and also supports displaying a piece of the data associated with each change.

The meta images also support various analysis. Examples include but are not limited to a histogram of activity, showing which ranges of the volume are changing frequently, showing the most common write lengths, showing whether writes are sequential or random, showing the portion of the volume that has changed in a time frame, the average rate of change, etc.

FIGS. 14A-C are block diagrams illustrating an example of stream overhead data 1400*a*-*c*. As noted previously the overhead data or portions thereof may be stored within the stream, or may be separately stored in association with the stream.

The set of overhead data 1400*a*-*c* in FIGS. 14A-C implements an example where each write, which may comprise many blocks, is accorded a piece of overhead data, rather than requiring overhead data for every block. Additionally, the example applies a timestamp only for a new write that has a different timestamp from the previous write, rather than requiring a potentially duplicative timestamp within the overhead data for successive writes. Finally, the example comprises overhead data that is of equal size, regardless of type. Various alternatives will be readily recognizable, with some specific examples offered below.

FIG. 14A illustrates overhead data 1400*a* for a typical write to the stream, denoted as "TYPE_WRITE". The overhead data 1400*a* includes an entry for the Block Offset in the corresponding volume, which is the block offset corresponding to the start of the write. Also included are the Length of the Write (in blocks) and the Block Offset of the data in the data store. This overhead data provides pointers to the start of the write in the volume and the data store, as well an indication of the length of the write. The terms block and offset correspond to one preferred implementation but it should be understood that other techniques for identifying the location and size of the data may be implemented.

One particular additional type of overhead data is illustrated in FIG. 14B. This overhead data is denoted TYPE_ZERO. This type of overhead data is used to provide an optimization wherein a write consisting of zeroes is recorded without requiring the corresponding zeroes to actually be physically stored. This can significantly economize on the use of storage for data in the stream.

The TYPE_ZERO overhead data includes the Block Offset in volume and Length of Write in Blocks, similar to that provided in the TYPE_WRITE overhead data. However, it is not necessary to retain the block offset in the data store, since physical storage is not required. Accordingly, this entry of the overhead data is blank (as noted, in this example the types of overhead data are of the same size). The usage of zeroes is purely by way of example. Additionally, the same principles may be applied to accommodate the same economization of storage where "ones" or other values are to be repeatedly stored.

Finally, a TYPE_TIME overhead data 1400*c* is illustrated in FIG. 14C. This type of overhead data 1400*c* adds a timestamp to the stream whenever a write occurs unless the previous write had the same timestamp value. In this fashion, successive writes that essentially occur at the same time (according to the granularity of the time stamp) avoid additional overhead data expense.

It should be appreciated that FIGS. 14A-C depict one example of a set of overhead data, and that numerous alternatives are available. For example, (1) additional types of overhead data may be included; (2) the overhead data may omit the TYPE_ZERO or the TYPE_TIME types; (3) a timestamp could be included as an entry in every TYPE_WRITE instance of overhead data; (4) overhead data could be associated with each and every block that is written; (5) characteristics other than block and offset may be used to define the location and size of data being stored. The artisan will readily recognize these and other potential options.

Figure 15:
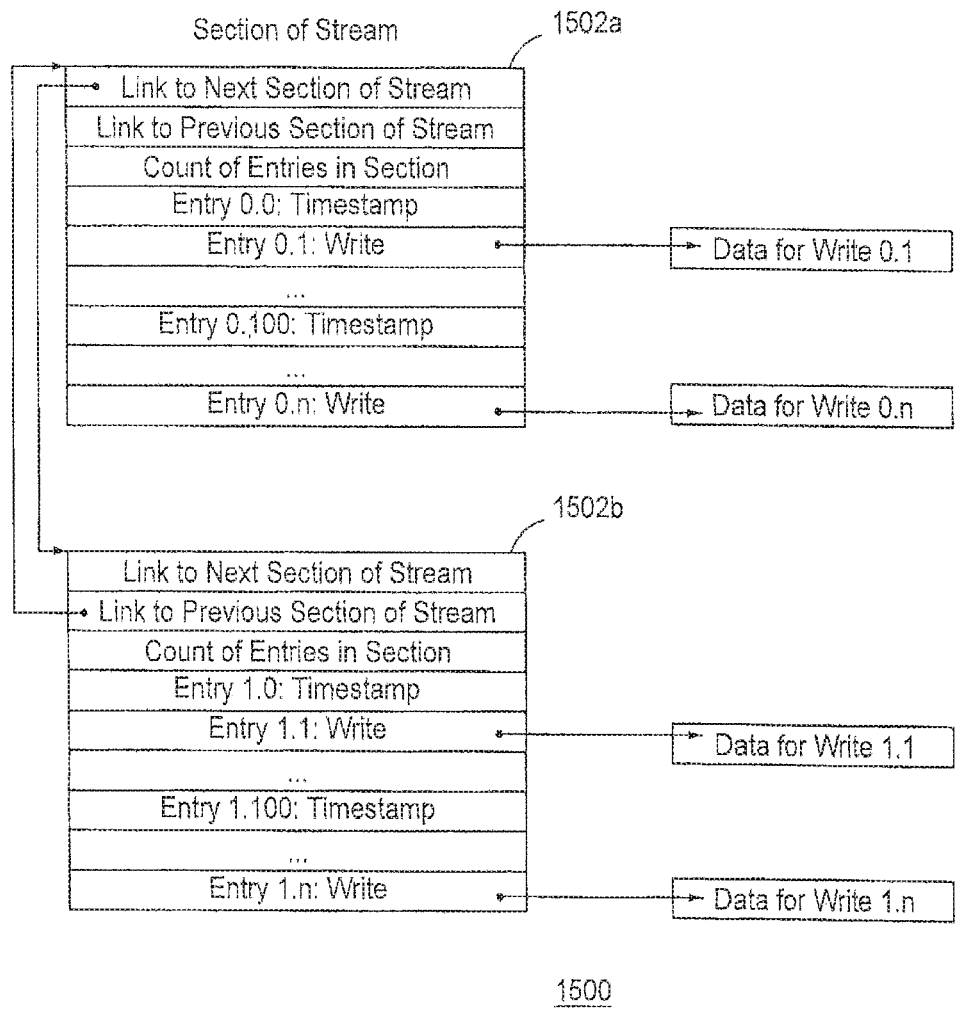
FIG. 15 is a block diagram illustrating an example of a stream layout as well as the option of composing a stream of sections.

FIG. 15 is a block diagram illustrating an example of a stream Layout as well as the option of composing a stream of Sections 1502a,b. With the sectioning feature, portions of the stream are easily segregated. This is useful for managing the location of the constituent sections of the stream, particularly where different storage resources are implemented for different portions of the stream. The use of Sections 1502a,b is optional, as a single stream Layout may be provided without sectioning. A single stream Layout option would include the features of either Section 1502a or 1502b, without the links to other sections.

The Sections 1502a,b respectively include Link to Next Section and Link to Previous Section entries to accommodate organization of the sectional relationship. The subsequent entry provides the number of entries "n" in the section 1502a,b.

Following this, any of the overhead data types may follow, such as the indicated Entry 0.0, which is a TYPE_TIME or timestamp entry, following by Entry 0.1, which is a TYPE_WRITE, entry 0.2, which is also a TYPE_WRITE, and so on. The pointer from the TYPE_WRITE type entries is illustrative of the indication of the block offset in the data store, with corresponding indicia of the Data for Write 0.1, 0.2, and so on through entry 0.n within Section 1502a, and Write 1.1 through 1.n within Section 1502b. It should be understood that the write transactions may be retained according to the linear append or arbitrary allocation modes as described previously. Either way, the stream Layout 1500 illustrates an example of retaining the sequence of write transactions according to the order in which the write transactions are received for a volume.

Figure 16:
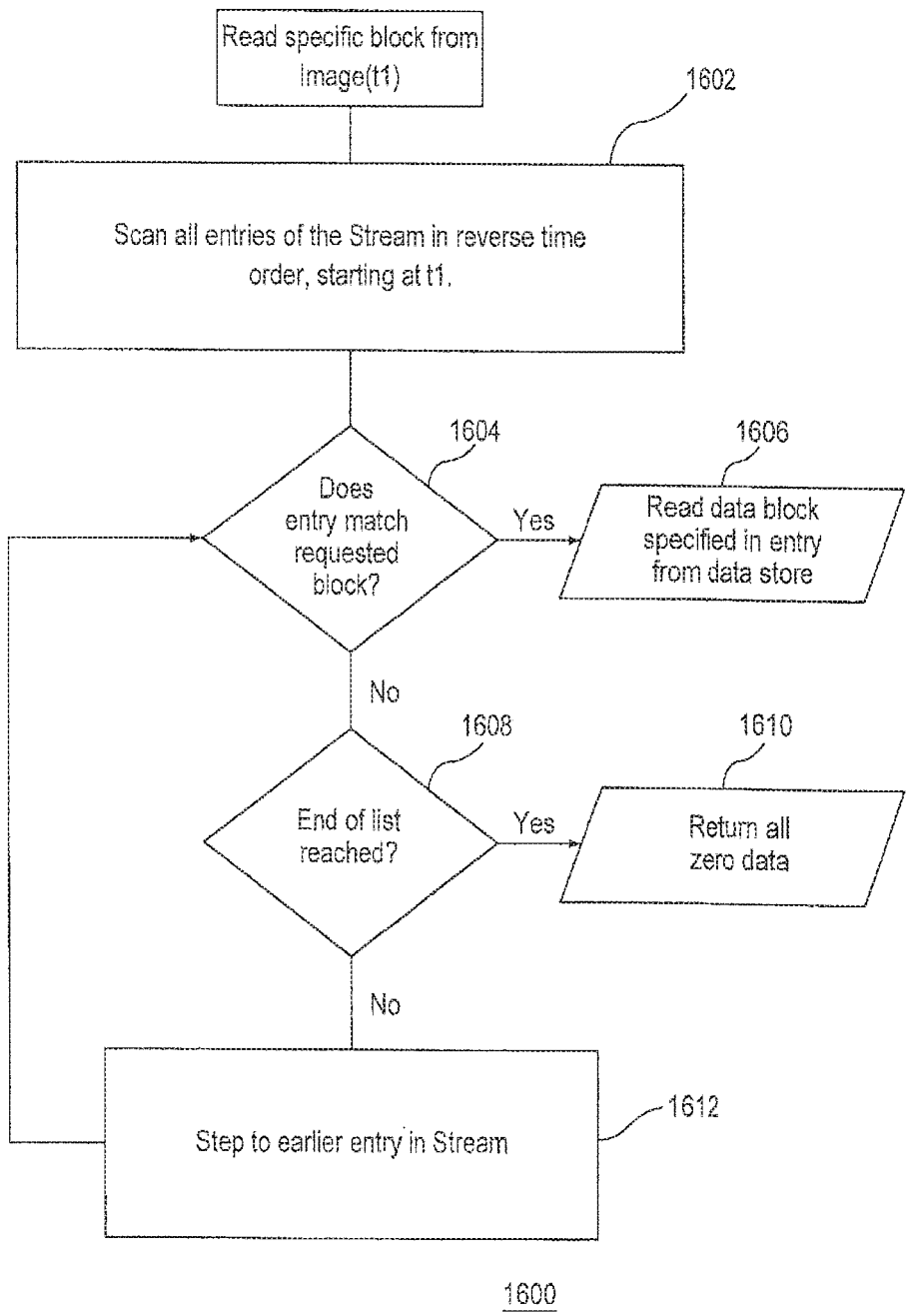
FIGS. 16-18 are flow diagrams illustrating examples of read and write operations in a stream architecture implementation.
Figure 17:
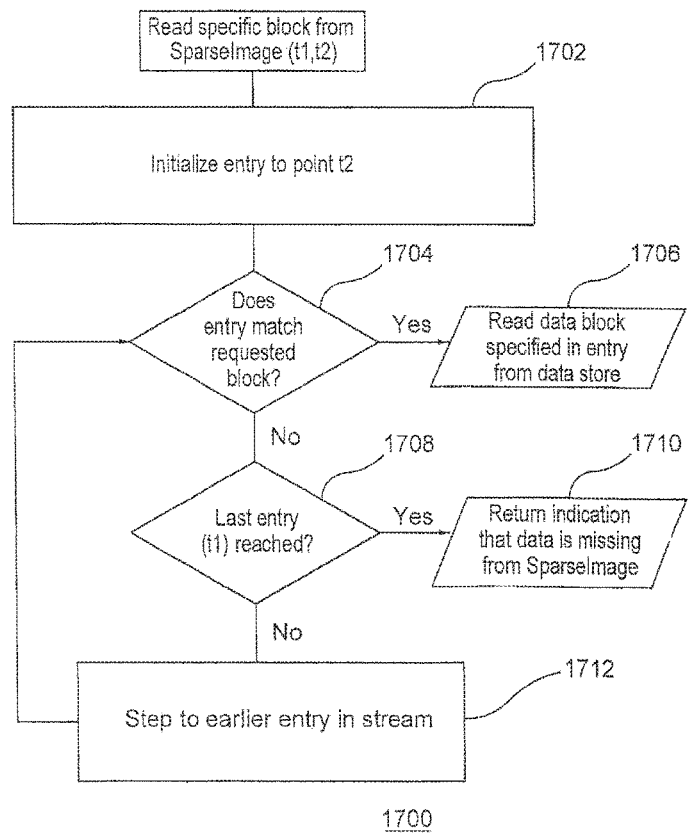
Figure 18:
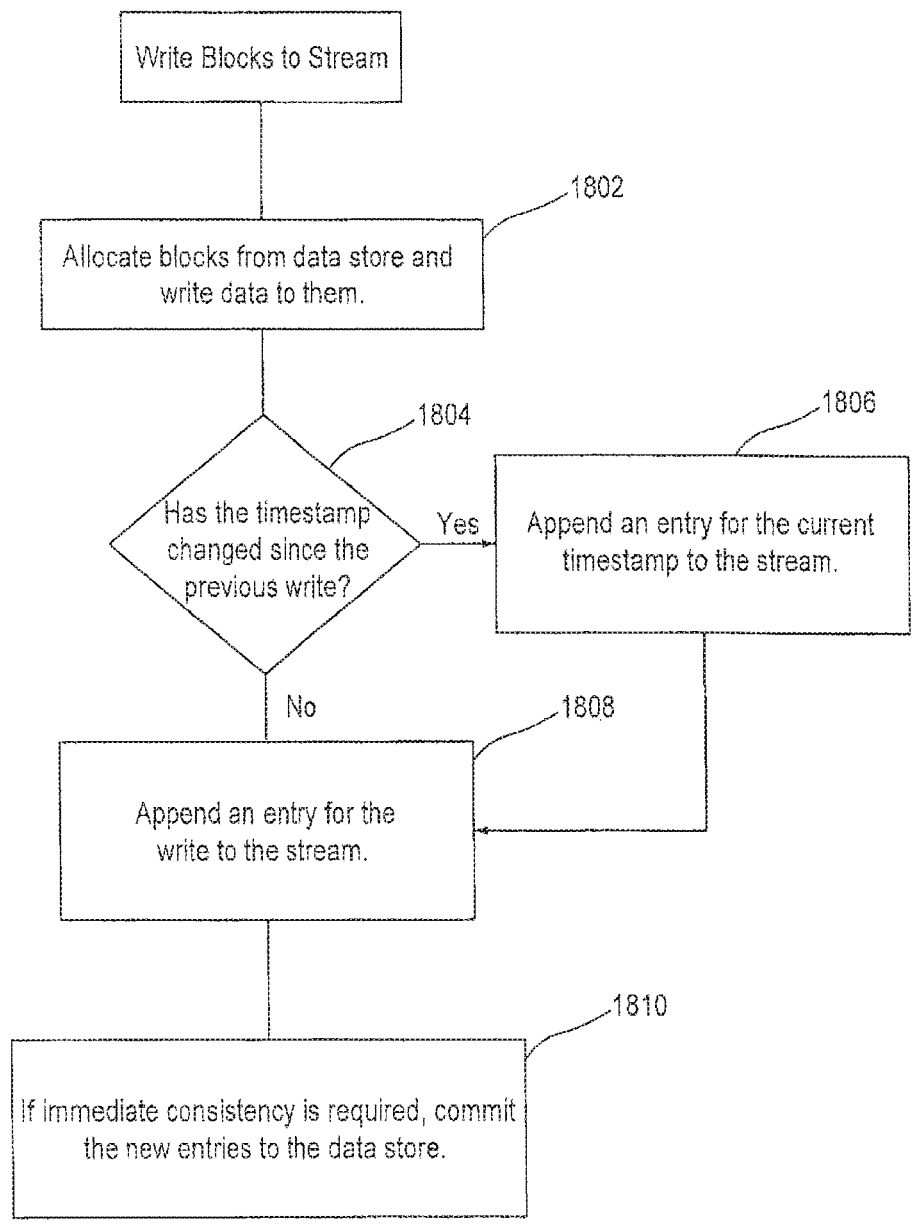

FIGS. 16-18 are flow diagrams respectively illustrating examples of read and write operations in a stream architecture implementation.

FIG. 16 illustrates a process 1600 for reading a specific block from a full Image, at time t1, denoted FullImage(t1) as described previously. The specific block is identified according to the block offset of the volume. All of the entries in the stream are scanned 1602 in reverse time order, starting at the time t1. This may optionally include navigation among multiple Sections of the stream as described above.

"Matching entries" are entries in the stream referencing the same block offset of the volume for the specific block being read. Starting at the most recent entry, a determination 1604 is made whether the current entry matches the requested block. If so, the data block specified in the entry is read 1606 and read is completed, since it would correspond to the most recent write of that block.

If it is determined 1604 that there is not a match, it is then determined 1608 whether the last entry for the stream has been reached. If so, this would mean that there were no matches in the stream, and therefore the read of the specified block would return 1610 all zero data as a result of the read.

If the end of the stream has not yet been reached, the process steps 1612 to the next (earlier) entry in the stream. The process continues with determinations 1604 of whether there is a match, with the first match prompting a read 1606 of the data block specified in the entry, and a determination 1608 that the last entry for the stream has been reached without a match prompting an all zero data read as described.

FIG. 17 illustrates a process 1700 for reading a specific block from a SparseImage(t1,t2). Again, the specific block is identified according to the block offset of the volume, but the entries of the stream to be examined do not proceed in reverse order through the entire stream. Instead, the sparse image read is dictated by the time boundaries of the sparse image. Accordingly, the process entails scanning all of the entries in the stream, starting at the time t2 and proceeding through the earlier time t1. Again, this may optionally include navigation among multiple Sections of the stream. This commences by initializing 1702 entry to time t2.

The read is otherwise similar to that described for the read of the Full Image. Matching entries are those entries in the stream referencing the same block offset of the volume for the specific block being read. Starting at the most recent entry, a determination 1704 is made whether there is a match for the specifically requested block. If so, the data block specified in the entry is read 1706 and read is completed, since it would correspond to the most recent write of that block.

If it is determined 1704 that there is not a match, it is then determined 1708 whether the last entry (t1) for the stream in the sparse image range has been reached. If so, this would mean that there were no matches in the stream for SparseImage(t1,t2), and therefore the read of the specified block would return 1710 indication that data for the specified block is missing from the SparseImage(t1,t2).

If the end of the stream has not yet been reached, the process steps 1712 to the next (earlier) entry in the stream. The process continues with determinations 1704 of whether there is a match, with the first instance of a match prompting a read 1706 of the data block specified in the entry, and a determination 1708 that the last entry for the stream has been reached without a match prompting the indication of missing data as described.

FIG. 18 illustrates a process 1800 for writing blocks to a stream. A write may correspond to multiple blocks. The process initially allocates 1802 blocks from the data store according to the requested write, and writes the data to the allocated blocks. If desired, a write zero scheme may be implemented, using overhead data such as the TYPE_ZERO type as described above. In such a scheme the zeroes are not actually written to the data store.

FIG. 18 illustrates an example wherein a timestamp is only included in the stream if the timestamp has changed since the previous write. This is optional, as the timestamp may simply be recorded in the stream for each write, regardless of whether it matches the previous one. A determination 1804 is made whether the timestamp has changed since the previous write. If it has changed, then an entry for the current timestamp is appended 1806 to the stream. This, for example, may be the overhead data denoted TYPE_TIME. If a Section implementation is being used, a new Section may also be allocated for the stream as necessary.

Next, an entry for the write is appended 1808 to the stream. The overhead data for this may be according to the TYPE_WRITE example as described above. This contains entries for the Block Offset in the volume for the write, as well as the Length of the Write (in blocks) and the Block Offset of the data in the data store.

Finally, a determination may be made as to whether immediate consistency is required. If so, then the new entries in the stream are committed 1810 to the data store. Since the data is written to the blocks in the data store (1802) at the start of the operation, this completes the process of committing the write to stable storage.

Figure 19:
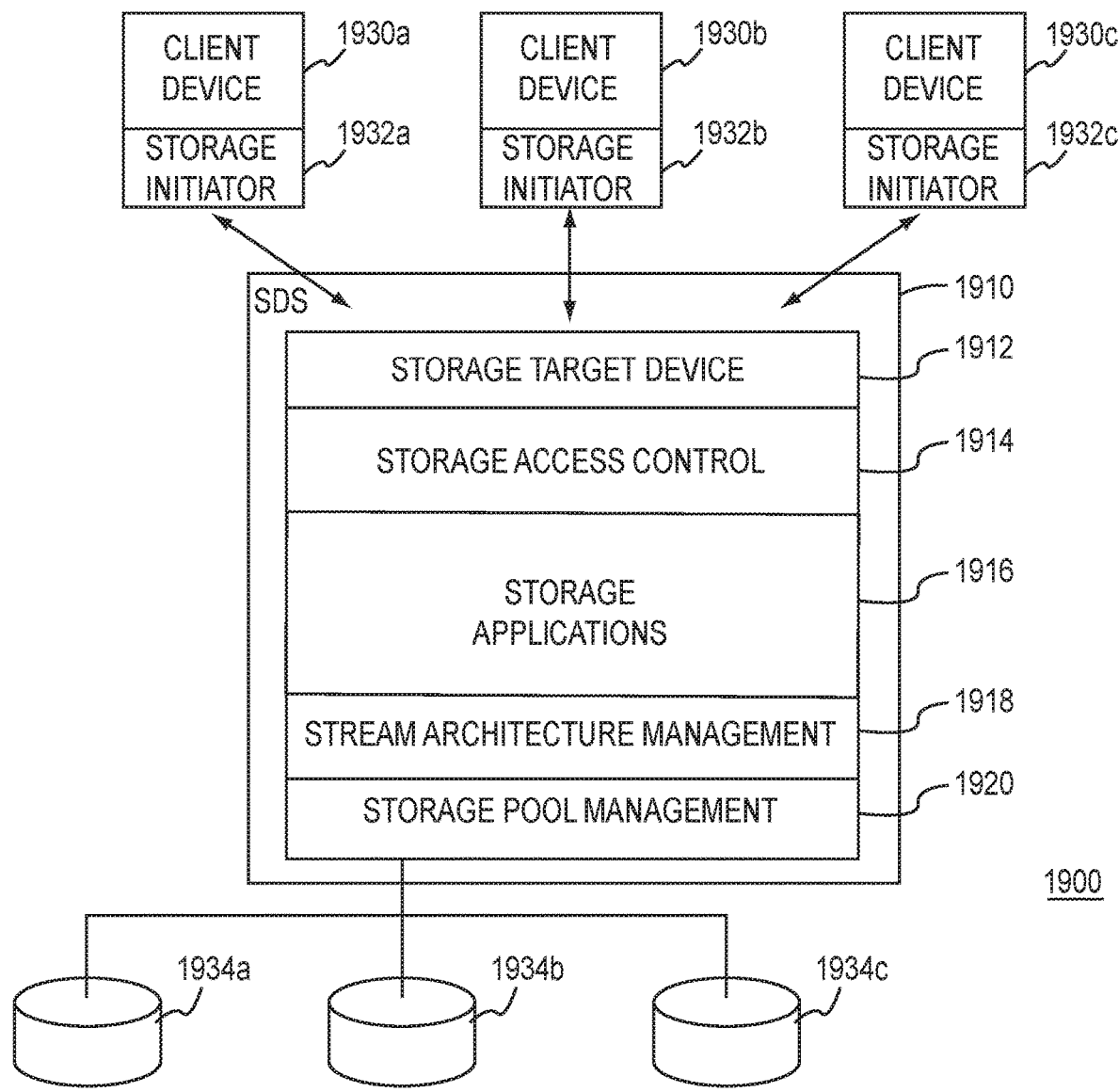
FIG. 19 is a schematic diagram illustrating an example of a storage network implementing stream architecture based data representation.

FIG. 19 is a schematic diagram illustrating an example of a storage network 1900 implementing stream architecture based data representation, particularly through inclusion of a stream architecture management module 1918.

The stream architecture management module 1918 is resident on a storage domain server (SDS) 1910. The SDS 1910 includes conventional computing resources (processor, memory, etc.) in order to carry out the functionality of operating as a storage resource for one or more client devices 1930*a-c*.

Specifically, the SDS 1910 may present virtual volumes to the client devices 1930*a-c*. Interfacing between the SDS 1910 and client devices 1930*a-c* may be according to any conventional protocol. For example, storage initiator devices 1932*a-c* of the client devices 1930*a-c* and a storage target device 1912 of the SDS 1910 may be established according to an iSCSI protocol. Alternatively, Fibre Channel (FC), SCSI, or other protocols may be used for communications between initiator and target devices.

The SDS 1910 provides security controls 1914 as well as any number of storage applications 1916 such as synchronous and asynchronous replication services, snapshots, caching, thin provisioning, etc.

The SDS 1910 also includes a storage pool management module 1920 that is configured to manage a pool of physical storage resources that are available to the SDS 1910. The physical storage resources 1934*a-b* may include hard disks, optical discs, tape, solid state memory, aggregations of any form of storage, or even another SDS that in turn provides corresponding physical storage resources.

In association with the provided storage service applications 1916, the stream architecture management module 1918 provides the stream architecture functionality described above, including the management of the stream with regard to write transactions directed to the SDS 1910, with retention of the corresponding sequence of write transactions according to the order in which the write transactions are received for any given volume that is presented to one or more of the client devices 1930*a-c* by the SDS 1910. The stream architecture management module also facilitates the association of the various types of stream images described above to the stream, and access to the stream in order to carry out the presentation and possible retention of corresponding images based upon the described stream images, also as described above.

The stream architecture management module 1918 is preferably provided as software, but may also implement hardware, firmware, or combinations of software, hardware, and/or firmware. It may be stored in memory and execute on a conventional processing platform as has been described. The program code of the stream architecture module 1918 may also be stored in non-volatile memory including but not limited to hard disks, optical disks, flash drives, or any non-transitory computer readable medium.

Figure 20:
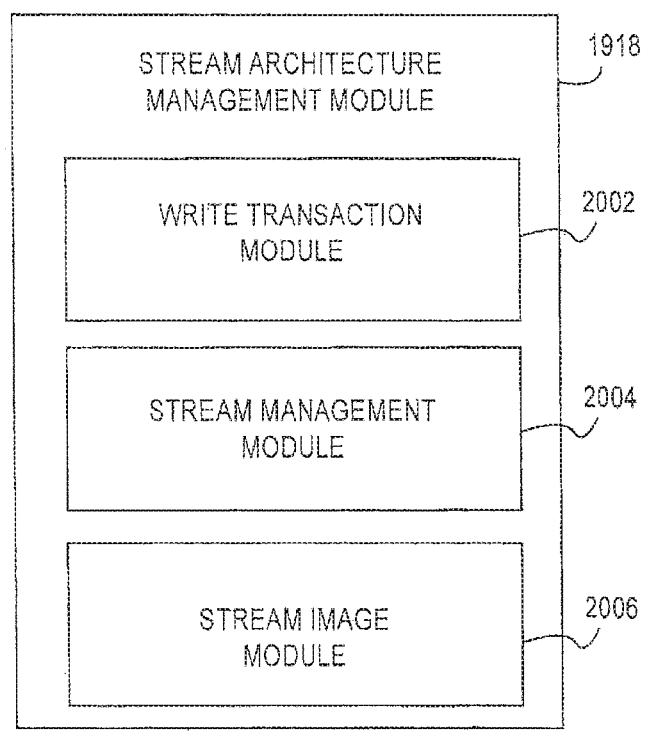
FIG. 20 is a block diagram illustrating an example of a computer system configured to include stream architecture for data representation.

FIG. 20 is a block diagram illustrating an example of a stream architecture management module 1918 in further detail. Specifically, the stream architecture management module 1918 includes a write transaction module 2002, a stream management module 2004 and a stream image module 2006.

The write transaction module 2002 receives the write transactions to volumes presented to client devices, and the stream architecture management module 2004 is configured to manage the retention of the stream based upon the received write transactions corresponding to any given volume. The stream architecture may optionally implement an append scheme wherein when a space is overwritten on a stream architecture volume, there is no overwrite in the associated stream. Instead, the write is appended to the stream. It is noted that appending each write transaction to a single store is not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. Additionally, as described previously, the maintenance of the sequence of write transactions may be performed within the stream itself, or via overhead data, which itself may be separately stored.

Finally, the stream image module associates stream images to the stream. The various types of stream images are described above. Generally, a stream image provides a representation of the data in the given volume for a point in time by referencing a non-contiguous subset of the sequence of write transactions in the stream. Noted examples include full and sparse image representations of the data in the given volume. Layering of stream images is also provided as described previously. Finally, any given stream image may be generated for the point in time retroactively, to accommodate retrieval of the full (or other) representation of the data in the given volume at a time after the point in time has passed.

Thus embodiments of the present invention produce and provide a stream architecture for data representation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for processing storage transactions in a node-based system having a plurality of nodes, the method comprising:
   receiving, by at least one processing unit, write transactions directed to a volume at any of the nodes, the write transactions having differing numbers of blocks;
   storing, at any of the nodes, a stream including a sequence of the write transactions according to an order in which the write transactions are received for the volume between a first point in time and a second point in time after the first point in time, wherein individual entries in the stream represent respective individual instances of the write transactions and the differing numbers of blocks occurring in the sequence of the write transactions;
   generating a stream image corresponding to the stream for an intermediate point in time that is between the first point in time and the second point in time; and
   in response to a read request that occurs after the intermediate point in time, retrieving data presented by the volume as of the intermediate point in time by accessing the stream image and the stream, the stream image providing a representation of the data in the volume, the stream image referencing a non-contiguous subset of the sequence of the write transactions in the stream in reverse time order starting at the intermediate point in time, wherein said referencing the noncontiguous subset of the sequence of the write transactions comprises excluding at least one entry in the sequence of the write transactions between the intermediate point in time and the first point in time, wherein the at least one entry that is excluded exists at the time of the read request.

2. The method of claim 1, wherein the sequence of the write transactions is maintained in a data structure wherein underlying data for the write transactions are sequentially appended to the data structure to retain the stream.

3. The method of claim 1, wherein underlying data for the write transactions are referentially included in the stream.

4. The method of claim 1, wherein overhead data contains information for maintaining the sequence of the write transactions, the overhead data being retained within the stream.

5. The method of claim 4, wherein the overhead data is maintained at all of the nodes, wherein said presenting the volume is provided from any of the nodes, even where the write transactions had been directed to nodes other than the node presenting the volume.

6. The method of claim 4, wherein the overhead data identifies which of the nodes corresponds to any given write transaction, with the identified node being among one or more of the nodes in the node-based system that maintains underlying data of said any given write transaction.

7. The method of claim 1, wherein the stream image provides a full representation of the data in the volume, and an additional stream is layered on the stream image, the additional stream providing, sequentially, the write transactions for the given volume following the point in time at which the full representation exists.

8. The method of claim 1, wherein storing the stream at any of the nodes is according to a guaranteed level of granularity at which the sequence of the write transactions is maintained at all of the nodes, wherein all of the nodes provide at least the guaranteed level of granularity for the sequence of the write transactions notwithstanding provision of a higher level of granularity being provided at a given one of the nodes.

9. A non-transitory computer readable medium storing program code for processing storage transactions in a node-based system having a plurality of nodes, the program code being executable by a processor to perform operations comprising:
   receiving write transactions directed to a volume at any of the nodes, the write transactions having differing numbers of blocks;
   storing, at any of the nodes, a stream including a sequence of the write transactions according to an order in which the write transactions are received for the volume between a first point in time and a second point in time after the first point in time, wherein individual entries in the stream represent respective individual instances of the write transactions and the differing numbers of blocks occurring in the sequence of the write transactions;
   generating a stream image corresponding to the stream for an intermediate point in time that is between the first point in time and the second point in time; and
   in response to a read request that occurs after the intermediate point in time, retrieving data presented by the volume as of the intermediate point in time by accessing the stream image and the stream, the stream image providing a representation of the data in the volume, the stream image referencing a non-contiguous subset of the sequence of the write transactions in the stream in reverse time order starting at the intermediate point in time, wherein said referencing the noncontiguous subset of the sequence of the write transactions comprises excluding at least one entry in the sequence of the write transactions between the intermediate point in time and the first point in time, wherein the at least one entry that is excluded exists at the time of the read request.

10. The computer readable medium of claim 9, wherein the sequence of the write transactions is maintained in a data structure wherein underlying data for the write transactions are sequentially appended to the data structure to retain the stream.

11. The computer readable medium of claim 9, wherein underlying data for the write transactions are referentially included in the stream.

12. The computer readable medium of claim 9, wherein overhead data contains information for maintaining the sequence of the write transactions, the overhead data being retained within the stream.

13. The computer readable medium of claim 12, wherein the overhead data is maintained at all of the nodes, wherein said presenting the volume is provided from any of the nodes, even where the write transactions had been directed to nodes other than the node presenting the volume.

14. The computer readable medium of claim 12, wherein the overhead data identifies which of the nodes corresponds to any given write transaction, with the identified node being among one or more of the nodes in the node-based system that maintains underlying data of said any given write transaction.

15. The computer readable medium of claim 9, wherein the stream image provides a full representation of the data in the volume, and an additional stream is layered on the stream image, the additional stream providing, sequentially, the write transactions for the given volume following the point in time at which the full representation exists.

16. The computer readable medium of claim 9, wherein storing the stream at any of the nodes is according to a guaranteed level of granularity at which the sequence of the write transactions is maintained at all of the nodes, wherein all of the nodes provide at least the guaranteed level of granularity for the sequence of the write transactions notwithstanding provision of a higher level of granularity being provided at a given one of the nodes.

17. An apparatus for data representation in a node-based data representation system having a plurality of nodes, the apparatus comprising:
   a processor; and
   a memory, the memory storing program code executable by the processor to perform operations comprising:
   receiving write transactions directed to a volume at any of the nodes, the write transactions having differing numbers of blocks;
   storing, at any of the nodes, a stream including a sequence of the write transactions according to an order in which the write transactions are received for the volume between a first point in time and a second point in time after the first point in time, wherein individual entries in the stream represent respective individual instances of the write transactions and the differing numbers of blocks occurring in the sequence of the write transactions;
   generating a stream image corresponding to the stream for an intermediate point in time that is between the first point in time and the second point in time; and
   in response to a read request that occurs after the intermediate point in time, retrieving data presented by the volume as of the intermediate point in time by accessing the stream image and the stream, the stream image providing a representation of the data in the volume, the stream image referencing a non-contiguous subset of the sequence of the write transactions in the stream in reverse time order starting at the intermediate point in time, wherein said referencing the noncontiguous subset of the sequence of the write transactions comprises excluding at least one entry in the sequence of the write transactions between the intermediate point in time and the first point in time, wherein the at least one entry that is excluded exists at the time of the read request.

\* \* \* \* \*